United States Patent
Haraguchi et al.

(10) Patent No.: US 6,859,079 B2
(45) Date of Patent: Feb. 22, 2005

(54) SEMICONDUCTOR DEVICE CAPABLE OF ACCURATELY PRODUCING INTERNAL MULTI-PHASE CLOCK SIGNAL

(75) Inventors: Yoshiyuki Haraguchi, Hyogo (JP); Kiyoshi Adachi, Hyogo (JP); Takashi Utsumi, Hyogo (JP); Danichi Komatsu, Hyogo (JP); Hiroyuki Kosaka, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 10/442,991

(22) Filed: May 22, 2003

(65) Prior Publication Data

US 2004/0104753 A1 Jun. 3, 2004

(30) Foreign Application Priority Data

Nov. 28, 2002 (JP) ........................................ 2002-345894

(51) Int. Cl.[7] ................................................ H03L 7/06
(52) U.S. Cl. ............................ 327/156; 327/296; 331/2
(58) Field of Search ................................. 327/156–163, 327/144–150, 291–297; 375/373–376; 331/DIG. 2, 11, 12, 1 A, 2, 17, 34

(56) References Cited

U.S. PATENT DOCUMENTS

| | | | | |
|---|---|---|---|---|
| 4,633,193 A | * | 12/1986 | Scordo ........................ 331/1 A |
| 5,072,195 A | * | 12/1991 | Graham et al. ................. 331/2 |
| 5,422,604 A | * | 6/1995 | Jokura ............................ 331/2 |
| 5,566,204 A | * | 10/1996 | Kardontchik et al. ........ 375/219 |
| 5,610,558 A | * | 3/1997 | Mittel et al. ................... 331/2 |
| 5,646,562 A | * | 7/1997 | Abe ........................... 327/156 |
| 6,150,887 A | * | 11/2000 | Yamaguchi .................. 331/11 |

FOREIGN PATENT DOCUMENTS

JP        63-087019 A      4/1988

\* cited by examiner

*Primary Examiner*—Minh Nguyen
(74) *Attorney, Agent, or Firm*—Burns, Doane, Swecker & Mathis, L.L.P.

(57) ABSTRACT

An operation control signal for an oscillator producing an internal clock signal phase-locked with a basic clock signal is applied to a second internal clock generating circuit. In the second internal clock generating circuit, with reference to the applied operation control signal, a control signal adjusting a phase and/or frequency difference between a synchronization target signal and a second internal clock signal is produced to adjust a phase and/or frequency of the second internal clock signal. A plurality of internal clock signals different in phase and/or frequency can be generated accurately and stably.

10 Claims, 15 Drawing Sheets

TO CURRENT SOURCE TRANSISTORS IN CURRENT CONTROLLED OSCILLATOR 13

SEMICONDUCTOR DEVICE CAPABLE OF ACCURATELY PRODUCING INTERNAL MULTI-PHASE CLOCK SIGNAL

BACKGROUND OF THE INVENTION

1. Field of the Invention

The present invention relates to a semiconductor device including a circuit for producing an internal clock signal phase-locked with an external clock signal, and more particularly to a semiconductor device producing a plurality of internal clock signals at least having different phases.

2. Description of the Background Art

In clock synchronous type devices, data transfer and processing is performed in synchronization with a clock signal. In such clock synchronous type devices, an internal clock signal synchronized with an external system clock, for example, is generated and a variety of internal operations are performed in synchronization with the internal clock signal. In a field of communication, for example, an internal clock signal is generated by reproducing a clock signal from received data, and the received data is processed in synchronization with this internal clock signal, or at the time of data transmission, data is sent in synchronization with the clock signal.

Furthermore, in clock synchronous type semiconductor memory devices, data, control signals and address signals externally applied are taken-in in synchronization with a clock signal and data is transferred in synchronization with the clock signal. For this clock synchronous operation, an internal clock signal synchronized with an external clock signal is internally generated, and signal/data taking-in and output transfer are performed in synchronization with this internal clock signal.

A PLL (Phase Locked Loop) circuit is generally used as a circuit for generating an internal clock signal phase-locked with a reference clock signal such as an external (system) clock signal. In the PLL circuit, a reference clock signal and an internal clock signal are compared in phase, and a signal in accordance with the phase difference is generated using a charger pump. An output signal of this charger pump is usually generated by a charged voltage of a capacitance element, and an oscillation frequency of an oscillation circuit is adjusted in accordance with the output signal of this charger pump. When the reference signal and the internal clock signal are matched in phase, the output signal of the charger pump is kept constant and the oscillation circuit oscillates at a constant oscillation frequency. The output signal of this oscillation circuit is utilized as the internal clock signal.

The oscillation circuit includes a current controlled oscillation circuit in which an oscillation frequency is adjusted by a control current and a voltage controlled oscillation circuit in which an oscillation frequency is adjusted by a control voltage.

In a PLL circuit, it is necessary to generate an internal clock signal accurately phase-locked with a reference clock signal without the effect of jitter and the like. A configuration of changing bandwidths and transient response characteristics of PLL circuit depending on a variety of usage, is disclosed in a prior art document 1 (Japanese Patent Laying-Open No. 63-87019). In the configuration in the prior art document 1, two phase-locked circuits receiving the same input signal are used, and an oscillation control signal output by one phase locked circuit is transmitted to the other phase locked circuit. In the other phase locked circuit, this oscillation control signal is mixed to adjust the oscillation frequency, thereby generating an internal clock signal.

In the prior art document 1, a phase comparison result of a first phase locked circuit is applied to a second phase locked circuit through an attenuator and an inverter. In the second phase locked circuit, an output signal from a second phase comparator is added to a signal transferred through the attenuator and the inverter from a first phase comparator to generate an oscillation control signal. By changing an attenuation ratio depending on received signal conditions, the order of closed loop transfer characteristic of this phase locked circuit is adjusted. More specifically, when the attenuation ratio is zero, the closed loop transfer characteristic is set to a second-order characteristic, and when the attenuation ratio is unity, the closed loop transfer function of this phase locked circuit is set to a function of a fourth-order characteristic. This attenuation ratio is set to zero for improving the transient response characteristics in a broad bandwidth, and to unity for enhancing the effect of suppressing jitter in a narrow bandwidth.

In the configuration of the prior art document 1 as described above, a clock signal is applied in common to the first and second phase locked circuits. A phase comparison result in the first phase locked circuit is applied to the second phase locked circuit through an attenuator and an inverter, a result of phase comparison between the a basic clock signal and an output clock signal in the second phase locked circuit is added to a phase comparison result supplied from the first phase locked circuit, and a result of the addition is applied to a voltage controlled oscillation circuit through a loop filter. In accordance with the addition result supplied through this loop filter, an oscillation frequency of the voltage controlled oscillation circuit in the second phase locked circuit is adjusted, whereby an output clock signal is generated.

Therefore, in the configuration of the prior art document 1, two phase-locked circuits are used for generating one kind of internal clock signal from a basic clock signal. When only one kind of internal clock signal is used in a semiconductor device, the configuration of the prior art document 1 can be used, in spite of its area penalty.

In some semiconductor devices, however, a plurality of internal clock signals having phases and/or frequencies slightly different from a basic clock signal may be required. Such cases includes, for example, a case where an internal clock signal is produced in synchronization with a signal input to a semiconductor device and an input signal is processed in accordance with this internal clock signal while an output signal is sent in accordance with a basic clock signal. The input signal (data) is generated based on a sending clock signal generated from the basic clock signal at the sending-side. Therefore, because of the transfer characteristics in this signal/clock transmission path, the input signal has its phase/frequency shifted from the basic clock signal. In particular, when in a semiconductor device an internal basic clock signal is generated by a clock buffer circuit and each data/signal taking-in is performed by an input buffer, internal clock propagation delay must be considered. Therefore, in order to accurately process the input signal, a clock signal synchronized with the input signal has to be generated.

Furthermore, when externally transferred data/signals are transferred at a different speed by a different device due to operation characteristics of external devices and the like, it is required to generate an internal signal synchronized with these data/signals for taking in data/signals. In this case, although the phases/frequencies of the signals/data are close to each other, an internal clock signal from one PLL circuit cannot be used to accurately take in these signals/data. In particular, when a transfer is performed in synchronization with a fast clock signal, an effect of a small phase/frequency shift is increased to make it difficult to take in signals/data accurately.

As a method of taking in such signals/data, it can be contemplated to provide phase locked circuits for synchronization object signals to generate internal clock signals synchronized with the respective synchronization object signals.

When such a plurality of phase locked circuits are provided, a plurality of phase locked circuits perform individual phase synchronization operations independently. Therefore, when an oscillation frequency of one phase locked circuit is stable, an oscillation frequency of another phase locked circuit is not always stable, resulting in that a long time is required to stabilize the oscillation frequency in each of the phase locked circuits.

Furthermore, where the frequencies of processed signals are different in these plurality of phase locked circuits and where separate phase locked circuits are provided, respective frequency adjusting circuits have to be provided in order to attain the identical operation characteristics among the separate phase locked circuits, resulting in an increased area occupied by the circuitry generating internal clock signals.

SUMMARY OF THE INVENTION

An object of the present invention is to provide a semiconductor device capable of accurately generating plural kinds of internal clock signals with a small occupying area.

Another object of the present invention is to provide a semiconductor device capable of stably generating plural kinds of internal clocks different in phase/frequency.

A semiconductor device in accordance with the present invention includes first internal clock generating circuitry producing a first internal clock signal synchronized with a basic clock signal, and second internal clock generating circuitry producing a second internal clock signal synchronized with a synchronization target signal.

The first internal clock generating circuitry includes a phase difference detecting circuit for detecting a phase difference between the basic clock signal and the first internal clock signal to produce a first control signal in accordance with the phase difference, and a first clock generating circuit having its operation speed determined in accordance with the first control signal outputted by the phase difference detecting circuit and operating in accordance with the operation speed to produce a signal corresponding to the basic clock signal as the first internal clock signal.

The second internal clock generating circuitry includes a second phase difference detecting circuit for detecting a phase difference between the synchronization target signal and the second internal clock signal to produce a phase error signal in accordance with the phase difference, a control circuit for producing a second control signal in accordance with at least a signal corresponding to the first control signal and the phase error signal, and a second clock generating circuit having its operation speed determined in accordance with the second control signal outputted by the control circuit and operating at the operation speed to produce a signal corresponding to the synchronization target signal as the second internal clock signal.

The clock control signal of the first internal clock generating circuit is applied to the second internal clock generating circuit, and in the second internal clock generating circuit, with reference to the first control signal applied from the first internal clock generating circuit, a signal controlling the operation speed of the second clock generating circuit is produced. Therefore, the second internal clock generating circuit operates in a frequency/phase region of the clock signal generated by the first internal clock generating circuit to produce the internal clock signal and thereafter sets the frequency/phase of the second internal clock signal finally in accordance with the phase difference/frequency difference between the synchronization target signal and the output clock signal. Therefore, even when this synchronization target signal and the basic clock signal have different phases and frequencies, the second internal clock signal synchronized with the synchronization target signal can be produced fast and accurately in the second internal clock generating circuit.

Furthermore, when the first internal clock generating circuit attains a state in which a clock is stably generated, the second internal clock generating circuit enters a locked state at high speed, thereby generating a plurality of internal clock signals stably. In addition, the stabilization timings of the internal clock signals are interrelated with each other, and the stabilization of the internal clock signals is achieved at a faster timing as compared with a case where internal clock signals are generated separately.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

[First Embodiment]

Figure 1:
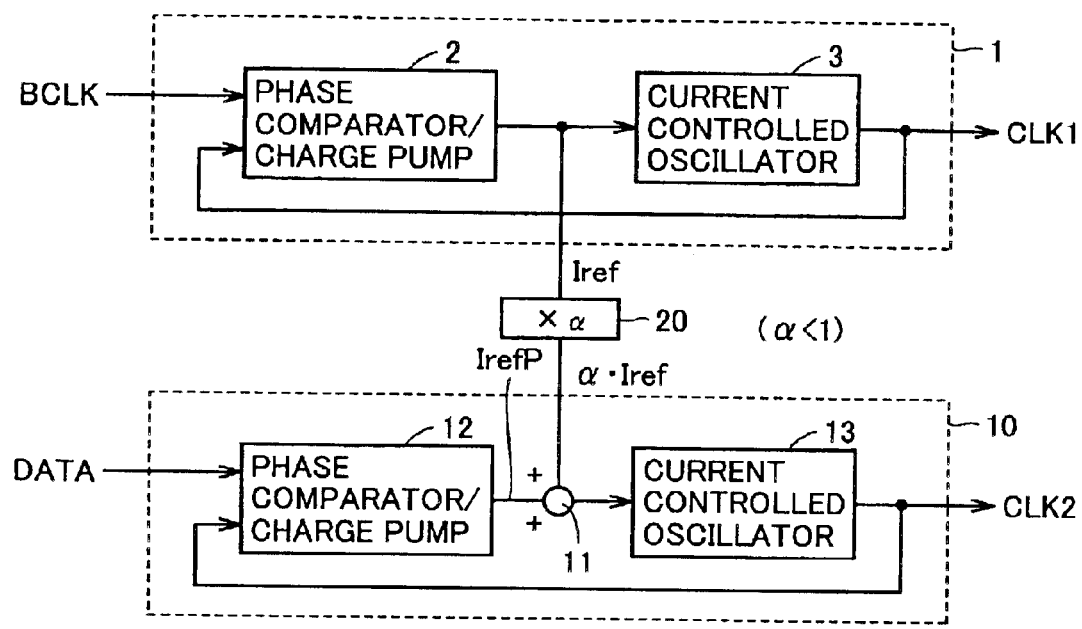
FIG. 1 is a diagram schematically showing a configuration of a semiconductor device in accordance with a first embodiment of the present invention.

FIG. 1 is a diagram schematically showing a configuration of a semiconductor device in accordance with a first embodiment of the present invention. In FIG. 1, this semiconductor device includes a first internal clock generating circuit 1 for generating a first internal clock signal CLK1 synchronized with a basic clock signal BCLK, and a second internal clock generating circuit 10 for generating a second internal clock signal CLK2 synchronized with external data DATA that is a synchronization object signal.

Basic clock signal BCLK is a basic clock signal in this semiconductor device, and external data DATA has its phase slightly shifted with respect to this basic clock signal BCLK.

First internal clock signal CLK1 is used for data output and internal processing in this semiconductor device. Second internal clock signal CLK2 is used in a circuit for processing external data DATA. External data DATA is, for example, external data (or a packet) in a communication system, second internal clock signal CLK2 synchronized with this external data DATA is detected, and external data DATA is accurately taken in and processed in synchronization with second internal clock signal CLK2.

First and second internal clock generating circuits 1 and 10 are substantially identical in the operation characteristics and are formed on the same semiconductor chip.

First internal clock generating circuit 1 includes a phase difference detecting circuit 2 making a phase comparison between basic clock signal BCLK and first internal clock signal CLK1 and generating a reference current (a first control signal) Iref in accordance with a result of the phase comparison, and a current controlled oscillator (a first internal clock generating circuit) 3 for performing an oscillation operation at an oscillation frequency determined in accordance with reference current Iref outputted by phase difference detecting circuit 2, and generating first internal clock signal CLK1.

Phase difference detecting circuit 2 includes a phase comparator for comparing the phase of basic clock signal BCLK with the phase of first internal clock signal, and a charge pump performing a charge pump operation in accordance with an output signal of the phase comparator to generate a signal indicative of a phase difference. Reference current Iref is generated based on the output signal of this charge pump. Therefore, this phase difference detecting circuit 1 includes a reference current generating circuit. A loop filter removing a low-frequency component is also provided in this phase difference detecting circuit 1.

The first internal clock generating circuit forms a phase locked loop (PLL). The configuration per se of the PLL circuit, formed of current controlled oscillator 3 and phase difference detecting circuit 2, is similar to that of the conventional circuit in the block level shown in FIG. 1.

Reference current Iref determines the operating current of current controlled oscillator 3. Reference current information Iref generated by first internal clock generating circuit 1 is multiplied by a coefficient α with a multiplier 20 and converted to a standard reference current α·Iref to be supplied to second internal clock generating circuit 10.

Second internal clock generating circuit 10 includes a phase difference detecting circuit 12 performing a phase comparison between external data DATA of a synchronization object and second internal clock signal CLK2 to generate reference current information in accordance with a result of the phase comparison, a current addition circuit 11 performing an addition of standard reference current α·Iref from multiplier 20 and reference current information outputted by phase difference detecting circuit 12, and a current controlled oscillator (a second internal clock generating circuit) 13 performing an oscillation operation with an oscillation frequency determined in accordance with output current (a second control signal) of current addition circuit 11 to generate second internal clock signal CLK2.

Phase difference detecting circuit 12 includes a phase comparator performing a phase comparison between external data DATA and second internal clock signal CLK2, and a charge pump performing charge pump operation in accordance with an output signal of the phase comparator to generate a phase error signal. The configuration of phase difference detecting circuit 12 is similar to the configuration of phase difference detecting circuit 2 and generates phase error signal IrefP in accordance with the output voltage of the charge pump.

Coefficient α of multiplier 20 is smaller than unity in the present first embodiment. Current controlled oscillators 3 and 13 have the same operation characteristics. Therefore, when phase difference detecting circuit 12 is not operated, the oscillation frequency of second internal clock signal CLK2 is lower than the oscillation frequency of first internal clock signal CLK1 as current controlled oscillator 13 performs an oscillation operation using standard reference current α·Iref as operating current.

Figure 2:
FIG. 2 is a graph showing a relation between current and oscillation frequency of a current controlled oscillator shown in FIG. 1.

FIG. 2 is a diagram schematically showing the oscillation characteristics of current controlled oscillators 3 and 13 shown in FIG. 1. In FIG. 2, the abscissa indicates reference current I and the ordinate indicates oscillation frequency f. As shown in FIG. 2, each of current controlled oscillators 3 and 13 has its oscillation frequency increased as the applied current I is increased. In other words, each of current controlled oscillators 3 and 13 operates using the applied current as operating current for an oscillation operation, the operation speed is increased with an increased operating current, the oscillation period is shortened accordingly, and the oscillation frequency is increased.

Now, consider that first internal clock generating circuit 1 is in a phase-locked state and the synchronization of internal clock signal CLK1 is established with respect to basic clock signal BCLK. In this state, reference current Iref outputted by phase difference detecting circuit 2 holds a constant value.

Second internal clock generating circuit 10 starts oscillation at a frequency lower than the oscillation frequency of first internal clock generating circuit 1, in accordance with standard reference current α·Iref from multiplication circuit 20. At this time, concurrently, a phase comparison is performed between external data DATA and second internal clock signal CLK2, and phase error current IrefP is generated in accordance with a result of the phase comparison. Addition circuit 11 performs an addition of current IrefP and α·Iref and supplies the addition result to current controlled oscillator 13 as operating current. Current controlled oscillator 13 receives standard reference current α·Iref as an initial current and increases its oscillation frequency from this initial oscillation frequency region in accordance with the output current of addition circuit 11.

Specifically, in second internal clock generating circuit 10, the basic oscillation frequency is set based on the standard reference current outputted by multiplier 20, and therefore, second internal clock signal CLK2 is generated with reference to the internal clock generating operation of first internal clock generating circuit 1 and second internal clock signal CLK2 can be generated after stabilization of first internal clock signal CLK1. Furthermore, once second internal clock signal CLK2 is stabilized, all of the internal clock signals needed in this semiconductor device are stabilized, and the stabilization timings of the internal clock signals can be faster as compared with the configuration where PLL circuits are operated independently to produce these internal clock signals CLK1 and CLK2 (as the pull-in operation of the second internal clock signal is started in a region in the vicinity of its frequency).

When this phase lock operation is established in second internal clock generating circuit 10, second internal clock generating circuit 10 generates second internal clock signal CLK2 in phase with external data DATA.

When external data DATA has the same frequency as basic clock signal BCLK but has its phase shifted from basic clock signal BCLK, second internal clock signal CLK2 is different in phase from and the same in frequency as first internal clock signal CLK1. In this second internal clock generating circuit 10, standard reference current α·Iref allows the oscillation operation at a frequency close to the frequency of external data DATA, and through the following phase lock operation, second internal clock signal CLK2 phase-locked with external data DATA can be generated fast and accurately.

In particular, since second internal clock CLK2 attains a stable state when first internal clock signal CLK1 is in a stable state, first internal clock generating circuit 1 is also in a stable state when second internal clock generating circuit 10 is stabilized. Therefore, a plurality of internal clock signals can be generated stably.

Figure 3:
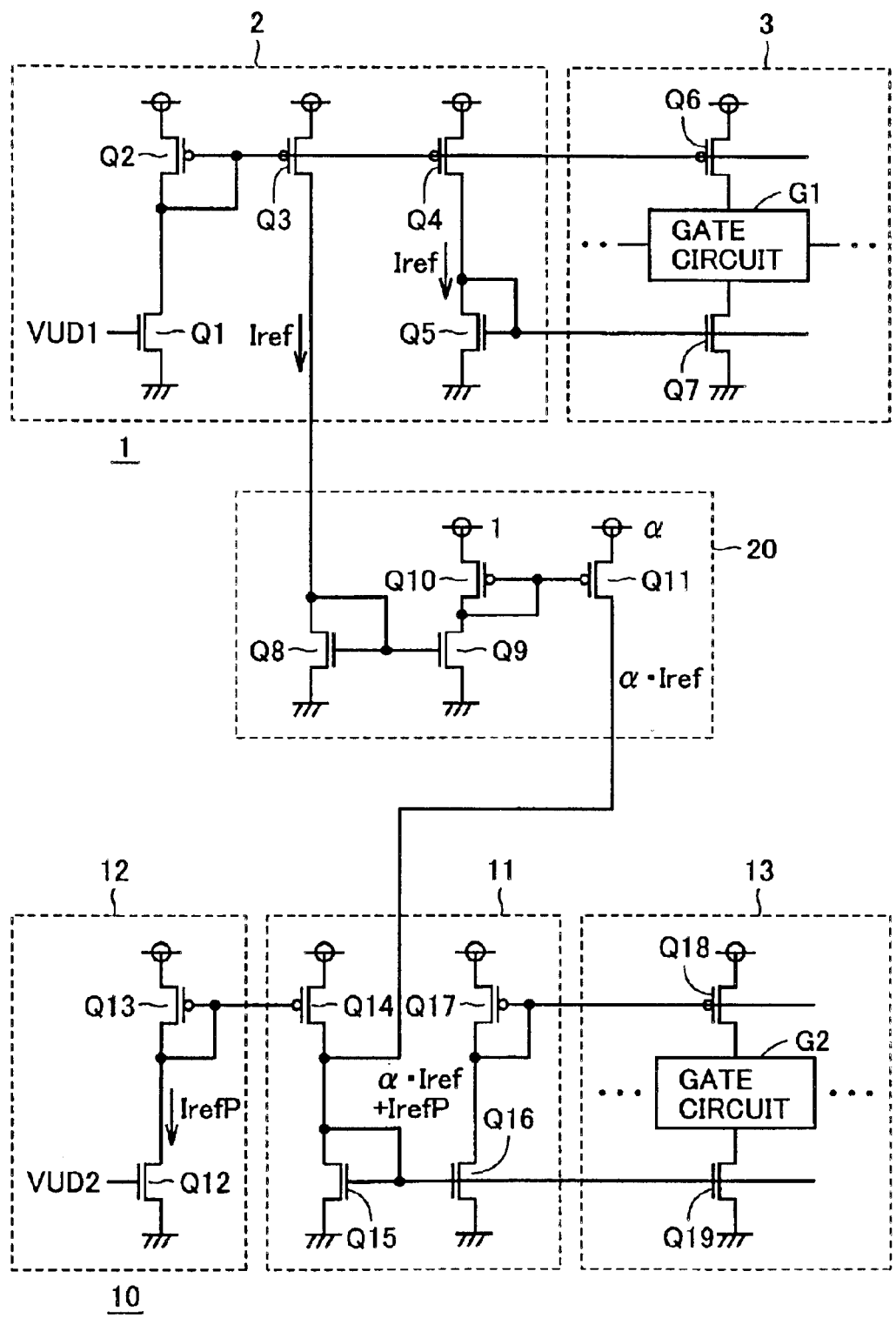
FIG. 3 is a diagram specifically showing a configuration of a main part of the semiconductor device shown in FIG. 1.

FIG. 3 is a diagram showing an exemplary configuration of a main part of the semiconductor device shown in FIG. 1. In FIG. 3, in first internal clock generating circuit 1, first phase difference detecting circuit 2 includes an N-channel MIS transistor (an insulating gate type field effect transistor) Q1 having a conductance adjusted in accordance with a control voltage VUD1, a P-channel MIS transistor Q2 supplying current to MIS transistor Q1, P-channel MIS transistors Q3 and Q4 each forming a current mirror circuit with MIS transistor Q2, and an N-channel MIS transistor Q5 receiving current from MIS transistor Q4.

P-channel MIS transistor Q2 has its gate and drain connected together and operates as a master of the current mirror circuit. MIS transistor Q5 has its gate and drain connected together, operates in a saturation region, and passes reference current Iref on.

Control voltage VUD1 is a voltage that corresponds to an output voltage of the charge pump included in phase difference detecting circuit 2, for example, a voltage that corresponds to a charged voltage of a capacitance element and is filtered by a loop filter (low pass filter).

MIS transistors Q3 and Q4 form current mirror circuits of a mirror ratio of 1 with MIS transistor Q2. MIS transistor Q1 has its driving current determined in accordance with control voltage VUD1, and the current flowing in this MIS transistor Q1 is supplied by MIS transistor Q2. Current Iref having the same magnitude as the current flowing in MIS transistor Q2 flows in MIS transistors Q3 and Q4. Current Iref from MIS transistor Q3 is supplied to multiplier 20.

Current controlled oscillator 3 includes a P-channel MIS transistor Q6 forming a current mirror circuit with MIS transistor Q2, an N-channel MIS transistor Q7 forming a current mirror circuit with MIS transistor Q5, and a gate circuit G1 performing a prescribed operation with the operating current thereof set by these MIS transistors Q6 and Q7. This gate circuit G1 is, for example, a component of a ring oscillator and is formed, for example, of an inverter.

MIS transistor Q5 operates as a master of the current mirror circuit. Where the mirror ratio of each of current mirror circuits formed by MIS transistors Q2 and Q5 is unity, current Iref having the same magnitude as each of MIS transistors Q2 and Q5 flows in each of MIS transistors Q6 and Q7. Therefore, when control voltage VUD1 is adjusted, the magnitude of reference current Iref is also changed. Accordingly, in current controlled oscillator 3, the operating current of gate circuit G1 is adjusted by MIS transistors Q6 and Q7, the operating speed thereof (delay time) is adjusted, and the oscillation frequency is adjusted.

Multiplier 20 includes an N-channel MIS transistor Q8 receiving reference current Iref from MIS transistor Q3, an N-channel MIS transistor Q9 forming a current mirror circuit with MIS transistor Q8, a P-channel MIS transistor Q10 supplying current to MIS transistor Q9, and a P-channel MIS transistor Q11 forming a current mirror circuit with MIS transistor Q10.

MIS transistors Q8 and Q9 form a current mirror circuit of a mirror ratio of 1, and MIS transistor Q8 operates as a master of the current mirror circuit. Therefore, current having the same magnitude as reference current Iref flows in MIS transistors Q10 and Q9.

In multiplier 20, MIS transistors Q8 and Q9 may form a current mirror circuit of a mirror ratio α, and MIS transistors Q10 and Q11 may form a current mirror circuit of a mirror ratio of 1.

MIS transistors Q10 and Q11 form a current mirror circuit of a mirror ratio α, and therefore current having a magnitude of α·Iref flows in MIS transistor Q11. By utilizing this current mirror circuit, standard reference current α·Iref can be generated without an adverse effect on the operating current of current controlled oscillator 3.

In second internal clock generating circuit 10, phase difference detecting circuit 12 includes an N-channel MIS transistor Q12 receiving a control voltage VUD2 corresponding to the output voltage of the charge pump at its gate, and a P-channel MIS transistor Q13 supplying current to MIS transistor Q12. MIS transistors Q13 has its gate and drain connected to each other. In MIS transistors Q13 and Q12, current having the same magnitude flows. In second phase difference detecting circuit 12, current corresponding to a phase error IrefP (phase error signal) is generated in accordance with control voltage VUD2.

Addition circuit 11 includes an MIS transistor Q14 forming a current mirror circuit with MIS transistor Q13, an N-channel MIS transistor Q15 receiving current from MIS transistor Q14 and current α·Iref from MIS transistor Q11 in multiplier 20, an N-channel MIS transistor Q16 forming a current mirror circuit with MIS transistor Q15, and a P-channel MIS transistor Q17 supplying current to MIS transistor Q16.

In this addition circuit 11, MIS transistors Q13 and Q14 form a current mirror circuit, and current having the same magnitude as current IrefP flowing in MIS transistor Q13 flows in MIS transistor Q14. Both of currents IrefP and α·Iref from MIS transistors Q14 and Q11 are discharged through MIS transistor Q15.

MIS transistors Q15 and Q16 form a current mirror circuit of a mirror ratio 1 with MIS transistor Q15 being a master, and MIS transistor Q16 drives the current having the same magnitude as the current flowing through MIS transistor Q15. The current to MIS transistor Q16 is supplied from MIS transistor Q17. Therefore, in MIS transistors Q17 and Q16, current having the magnitude of current α·Iref+IrefP flows.

Current controlled oscillator 13 includes a P-channel MIS transistor Q18 forming a current mirror circuit with MIS transistor Q17, an N-channel MIS transistor Q19 forming a current mirror circuit with MIS transistor Q15, and a gate circuit G2 receiving operating current with these MIS transistors Q18 and Q19 being current source transistors, for performing a prescribed operation. This gate circuit G2 is, for example, a component of a ring oscillator and is formed of an inverter.

MIS transistors Q17 and Q18 are the same in size (the ratio of the channel width to the channel length), and MIS transistors Q15 and Q19 are the same in size. Therefore, current α·Iref+IrefP flows in these MIS transistors Q18 and Q19, gate circuit G2 receives the current flowing in these MIS transistors Q18 and Q19 as operating current to have the operation speed (delay time) thereof determined, and the oscillation frequency of current controlled oscillator 13 is determined accordingly.

Therefore, in this addition circuit 11, when current α·Iref attains a constant value, current Iref is gradually increased in accordance with control voltage VUD2 to increase output current α·Iref+IrefP of addition circuit 11 and thus to increase the oscillation frequency of current oscillator 13. At a time when external data DATA and second internal clock signal CLK2 finally match in phase, the output current of addition circuit 11 holds a constant value.

The phase adjustment is performed using output current α·Iref of multiplier 20 as a starting current, and current controlled oscillators 3 and 13 have the same operation characteristics. An internal clock signal phase-locked with external data can be generated at high speed by performing a phase comparison operation with the current value increased starting at output current α·Iref of multiplier 20. In particular, when a phase difference between the external data and the reference clock signal is small, the pull-in is performed at high speed to establish lock.

It is noted that in the configuration shown in FIG. 3, the operating current of current controlled oscillator 13 is determined by adding reference current Iref to output current IrefP of second phase difference detecting circuit 12. In place of this configuration, a configuration of eventually performing an addition of currents based on control voltages VUD1 and VUD2 may be used. More specifically, N-channel MIS transistors receiving at their respective gates control voltages VUD1 and VUD2 are provided in parallel, and a P-channel MIS transistor having its gate and drain connected together is connected in common to these two N-channel MIS transistors. The supply current of this P-channel MIS transistor will be α·Iref+IrefP, and the slave transistor of the current mirror circuit is used to generate the operating current for current controlled oscillator 13.

In the configuration shown in FIG. 3, for example, an N-channel MIS transistor receiving at its gate control voltage VUD1 is arranged in parallel with MIS transistor Q12, and the mirror current supplied by MIS transistor Q14 for the current supplied by MIS transistor Q13 is applied to MIS transistors Q18 and Q19 as the operating current of current controlled oscillator 13. In this case, the configuration of addition circuit 11 shown in FIG. 3 can be simplified, resulting in a reduced layout area of the circuitry.

Therefore, the current corresponding to the operating current of current controlled oscillator 3 in first internal clock generating circuit 1 need not be transferred through multiplier 20 to second internal clock generating circuit 10. Only a signal determining the operating current of current controlled oscillator 3 is applied to second internal clock generating circuit 10 as a reference signal.

It is noted that the value of coefficient α is set to an appropriate value in accordance with a phase shift of the external data of synchronization target with respect to basic clock signal BCLK.

As described above, in accordance with the first embodiment of the present invention, with reference to the current that determines the oscillation frequency of the first internal clock generating circuit generating an internal clock signal synchronized with a basic clock signal, pull-in operation for the external data is performed in the second internal clock generating circuit. Therefore, it is possible to generate a second internal clock signal phase-locked with the external data having a phase slightly shifted from this basic clock signal at high speed.

Furthermore, the second internal clock generating circuit performs pull-in operation when the first internal clock generating circuit is stabilized, and therefore, the first internal clock generating circuit is also in a stable state at the time of a stable operation of the second internal clock generating circuit. As a result, all of the internal dock generating circuits can be maintained at the stable state reliably.

[Second Embodiment]

Figure 4:
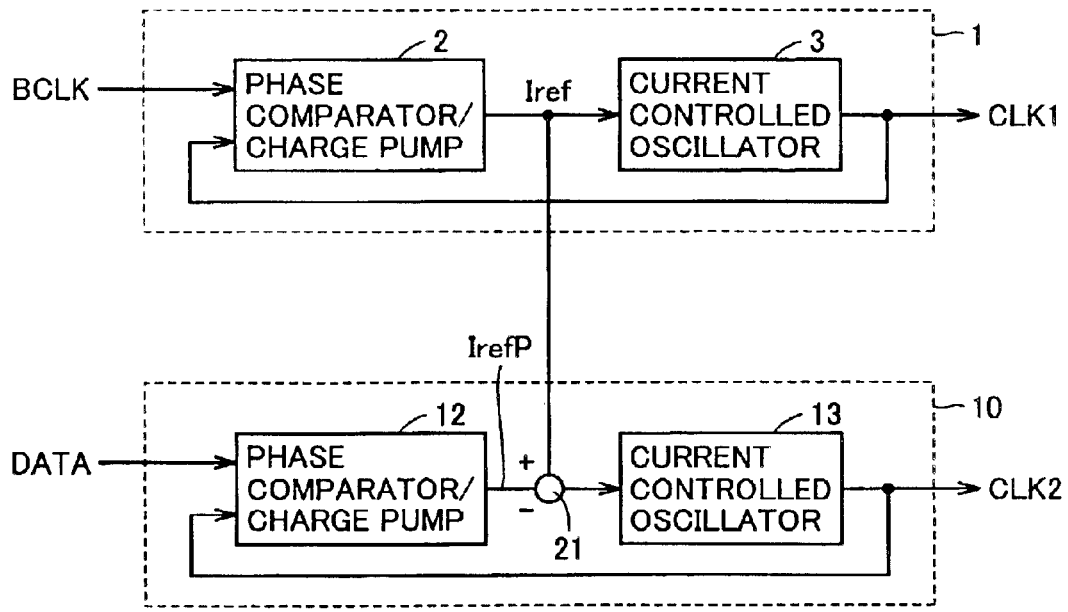
FIG. 4 is a diagram schematically showing an overall configuration of a semiconductor device in accordance with a second embodiment of the present invention.

FIG. 4 is a diagram schematically showing a configuration of a semiconductor device in accordance with a second embodiment of the present invention. In a configuration shown in FIG. 4, first internal clock generating circuit 1 has the same configuration as shown in FIG. 1, and includes phase difference detecting circuit 2 and current controlled oscillator 3 performing an oscillation operation in accordance with reference current Iref outputted by phase difference detecting circuit 2.

Reference current Iref generated by first internal clock generating circuit 1 is applied to second internal clock generating circuit 10, not through a multiplier. In other words, multiplier 20 shown in FIG. 1 is not provided between internal clock generating circuits 1 and 10.

Second internal clock generating circuit 10 is different from second internal clock generating circuit 10 shown in FIG. 1 in its configuration in the following point. An addition circuit 21 for combining reference current Iref from first internal clock generating circuit 1 and output current IrefP of phase difference detecting circuit 12 is provided between phase difference detecting circuit 12 and current controlled oscillator 13. This addition circuit 21 performs an operation for obtaining a difference between reference current Iref and phase error current IrefP, and operates as a subtractor for generating a current Iref–IrefP. The output current of addition circuit 21 is applied to current controlled oscillator 13 as a current determining the operating current of the oscillator 13.

The other configuration of second internal clock generating circuit 10 shown in FIG. 4 is the same as second internal clock generating circuit shown in FIG. 1.

In second internal clock generating circuit 10 shown in FIG. 4, when reference current Iref is in a stable state, current controlled oscillator 13 first performs an oscillation operation with the operating current defined by reference current Iref When first internal clock generating circuit 1 is in a stable state, reference current Iref is also at a constant value. Since current controlled oscillators 3 and 13 have the same operation characteristics, these current controlled oscillators 3 and 13 perform the oscillation operation at substantially the same frequency.

Upon application of external data DATA, a phase comparison between external data DATA and internal clock signal CLK2 is performed in phase difference detecting circuit 12. In addition circuit 21, current Iref–IrefP is generated. Therefore, current less than reference current Iref is supplied to current controlled oscillator 13, and the oscillation frequency of current controlled oscillator 13 becomes lower than the oscillation frequency of current controlled oscillator 3. With a decreased oscillation frequency of current controlled oscillator 13, control current IrefP is generated by the phase comparator 12 and the charge pump in phase difference detecting circuit 12 such that external data DATA and second internal clock signal CLK2 are in phase. More specifically, current controlled oscillator 13 performs an oscillation operation at the oscillation frequency defined by reference current Iref and the oscillation frequency is gradually lowered from this starting oscillation frequency so that the phase of second internal clock signal CLK2 can be delayed. As a result, it is possible to generate second internal clock signal CLK2 phase-locked with external data DATA having a phase lagging behind first internal clock signal CLK1, reliably.

Therefore, in second internal clock generating circuit 10, an oscillation operation is performed in a frequency region of first internal clock signal CLK1 outputted by first internal clock generating circuit 1 and a phase comparison operation is performed with respect to external data DATA, so that internal clock signal CLK2 phase-locked with external data DATA having a phase close to that of internal signal CLK1 can be generated at high speed.

It is noted that at the time of stable operation of second internal clock generating circuit 10, first internal clock generating circuit 1 is also in a stable state, and a plurality of internal clock generating circuits can be maintained in a stable state easily.

Furthermore, in the configuration shown in FIG. 4, as the phase error detected in phase difference detecting circuit 12 increases, the amount of the control current outputted by addition circuit 21 is reduced. On the other hand, in the configuration shown in FIG. 1, as the phase error detected in phase difference detecting circuit 12 increases, the amount of the control current output by the addition circuit 21 is increased. In either case, the phase error signal outputted by phase difference detecting circuit 12 has its value increased as the phase error between second internal clock signal CLK2 and external data DATA is increased. Therefore, even with the different configuration of the addition circuit that generates the control current for current controlled oscillator 13, phase difference detecting circuit 12 can perform the phase error detection and the phase error signal generation with the same configuration.

Figure 5:
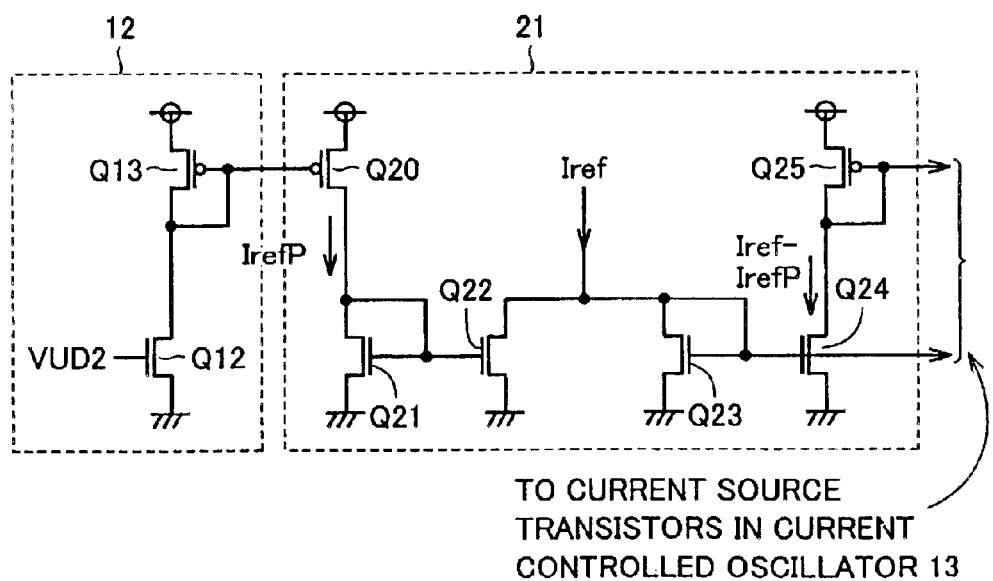
FIG. 5 is a diagram showing an exemplary configuration of an addition circuit shown in FIG. 4.

FIG. 5 is a diagram showing an exemplary configuration of addition circuit 21 shown in FIG. 4. In FIG. 5, phase difference detecting circuit 12 includes an MIS transistors Q12 receiving a control voltage VUD2 at its gate, and a P-channel MIS transistor Q13 supplying current to MIS transistor Q12, in a manner similar to the configuration shown in FIG. 3.

Addition circuit 21 includes a P-channel MIS transistor Q20 forming a current mirror circuit with MIS transistor Q13 and supplying phase error current IrefP, an N-channel MIS transistor Q21 discharging the current from MIS transistor Q20, an N-channel MIS transistor Q22 forming a current mirror circuit with MIS transistor Q21, and an N-channel MIS transistor Q23 arranged in parallel with MIS transistor Q22. Reference current Iref is applied in common to MIS transistors Q22 and Q23.

MIS transistor Q21 has its gate and drain connected together to form a master stage of the current mirror circuit, and the current of the same magnitude flows in MIS transistors Q21 and Q22. Reference current Iref is applied in common to MIS transistors Q22 and Q23. Therefore, current Iref–IrefP flows in MIS transistor Q23.

Addition circuit 21 further includes an N-channel MIS transistor Q24 forming a current mirror circuit with MIS transistor Q23, and a P-channel MOS transistor Q25 supplying current to MIS transistor Q24. MIS transistor Q25 has its gate and drain connected together. MIS transistors Q23 and Q24 form a current mirror circuit with a mirror ratio of 1. The gates of MIS transistors Q24 and Q25 are coupled to the gates of the ground-side and power supply-side current source transistors in current controlled oscillator 13 shown in FIG. 4, respectively.

In phase difference detecting circuit 12, current flows in MIS transistors Q13 and Q12 in accordance with control voltage VUD2. Current, the same in magnitude as the current flowing in MIS transistor Q13, is supplied through MIS transistor Q20 to MIS transistor Q21. When control voltage VUD2 has its voltage level raised, this phase error current IrefP increases, and when control voltage VUD2 has its voltage level lowered, phase error current IrefP has its magnitude reduced. When the external data and the second internal clock signal are in phase, phase error current IrefP is held at a constant value.

Since MIS transistor Q22 drives current IrefP, current Iref–IrefP flows in MIS transistor Q23. MIS transistor Q24 forms a current mirror circuit with MIS transistor Q23 at a mirror ratio of 1, and current Iref IrefP flows in these MIS transistors Q24 and Q25. Therefore, the operating current of current controlled oscillator 13 is determined by Iref–IrefP. The basic oscillation frequency of current controlled oscillator 13 is determined by reference current Iref, and the oscillation frequency is adjusted in accordance with control voltage VUD2 when the external data is applied. In phase adjustment, current controlled oscillator 13 has the oscillation frequency lowered from the basic frequency that is determined by the reference current, the phase of output clock signal CLK2 is delayed with the increase in phase error current IrefP, and external data DATA and internal clock signal CLK2 are caused to match in phase.

At a time when external data DATA and second internal clock signal CLK2 finally match in phase, the voltage level of control voltage VUD2 is held constant and current IrefP is responsively held constant. In this addition circuit 21, phase error current IrefP is subtracted from reference current Iref that determines the oscillation frequency of first internal clock generating circuit 1, in accordance with the phase difference. As a result, second internal clock generating circuit 10 can be oscillated at a region in the vicinity of the oscillation frequency of first internal clock generating circuit 1, and internal clock signals CLK1 and CLK2 can be generated which are phase-locked with basic clock signal BCLK and external data DATA, respectively.

It is noted that in the configuration shown in FIG. 4, reference current Iref is applied to addition circuit 21. With a coefficient β being greater than unity, however, current β·Iref may be applied to addition circuit 21 as a standard reference current, and second internal clock generating circuit 10 performs first the oscillation operation with the oscillation frequency higher than the oscillation frequency of first internal clock generating circuit 1, and then has the oscillation frequency reduced gradually. In this case, either when external data DATA leads or lags in phase basic clock signal BCLK, the phase adjusting operation for phase lag or phase lead on second internal clock signal CLK2 is performed in second internal clock generating circuit 10, thereby generating the internal clock signal CLK2 phase-locked with external data DATA.

As described above, in accordance with the second embodiment of the present invention, in the second internal clock generating circuit, with reference to the reference current that determines the oscillation frequency of the first internal clock generating circuit, the standard reference current is corrected based on the phase comparison between the second internal clock signal and the external data to adjust the phase of the second internal clock signal, and the internal clock signals different from each other in phase or frequency can be generated stably at high speed.

[Third Embodiment]

Figure 6:
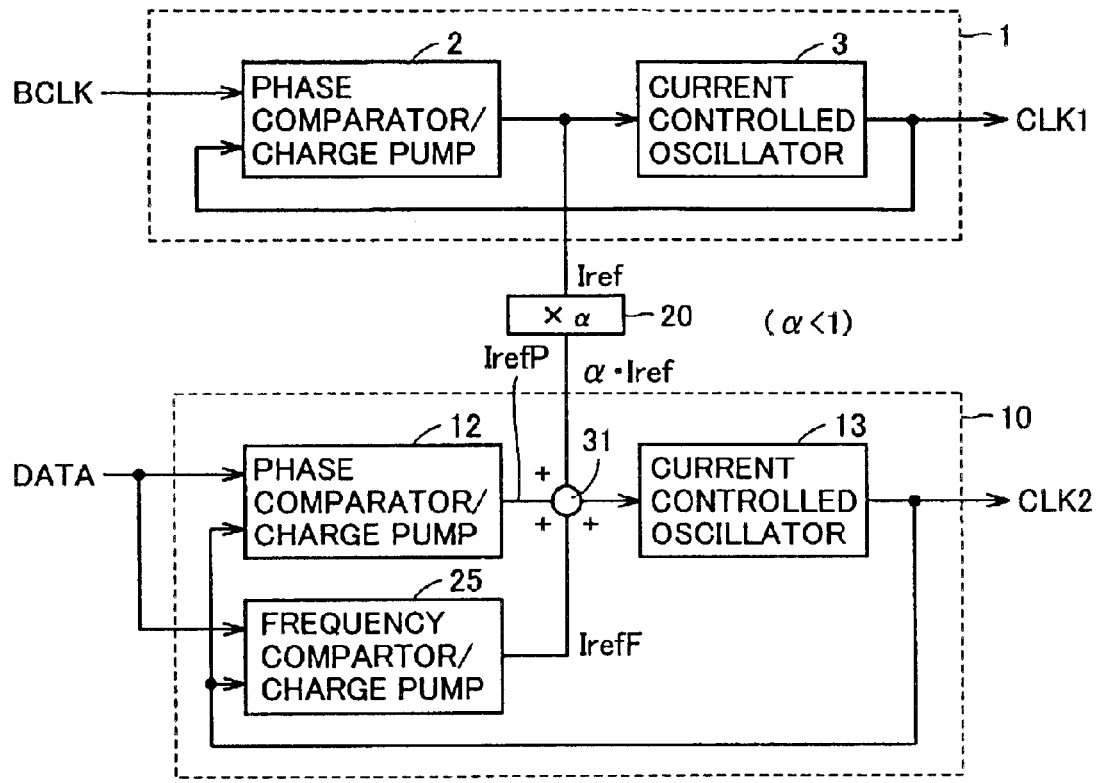
FIG. 6 is a diagram schematically showing a configuration of a semiconductor device in accordance with a third embodiment of the present invention.

FIG. 6 is a diagram schematically showing a configuration of a semiconductor device in accordance with a third embodiment of the present invention. In the semiconductor device shown in FIG. 6, the configuration of second internal clock generating circuit 10 differs from that of the internal clock generating circuit shown in FIG. 1. More specifically, in second internal clock generating circuit 10, there are provided a frequency difference detecting circuit 25 for comparing external data DATA with second internal clock signal CLK2 in frequency and generating a frequency error current IrefF in accordance with a result of comparison, and an addition circuit 31 for performing an addition of standard reference current α·Iref outputted by multiplier 20 and the outputs IrefP and IrefF of phase difference detecting circuit 12 and frequency difference detecting circuit 25.

Frequency difference detecting circuit 25 includes a frequency comparator for comparing in frequency external data DATA with second internal clock signal CLK2, a charge pump performing charge pump operation based on a comparison result of the frequency comparator, and a circuit portion for generating frequency error current IrefF based on the output signal (voltage/current) of the charge pump.

Addition circuit 31 adds up all of currents α·Iref, IrefP and IrefF to generate and apply a control current to current controlled oscillator 13.

The other configuration of the semiconductor device shown in FIG. 6 is the same as the configuration shown in FIG. 1, and the corresponding parts will be denoted with the same reference numerals and therefore the detail description will not be repeated.

In second internal clock generating circuit 10 shown in FIG. 6, frequency difference detecting circuit 25 detects a frequency difference between external data DATA and second internal clock signal CLK2. Similarly to the first embodiment, addition circuit 31 receives current α·Iref that is α times reference current Iref determining the oscillation frequency of first internal clock generating circuit 1. Therefore, in second internal clock generating circuit 10, after the oscillation operation is started with a frequency lower than the oscillation frequency of first internal clock generation circuit 1 as a basic frequency, internal clock signal CLK2 matched in frequency and phase to external data DATA can be generated.

Furthermore, even when basic clock signal BCLK and external data DATA differ in frequency, internal clock signal CLK2 precisely synchronized with the external data can be generated.

Internal clock signal CLK2 coarsely phase-locked with external data DATA is generated by the use of frequency difference detecting circuit 25 and through the frequency difference comparison operation thereof, and the phase adjustment of internal clock signal CLK2 is performed through phase comparison, whereby internal clock signal CLK2 that is precisely matched or locked in phase with external data DATA can be generated at high speed.

Frequency difference detecting circuit 25 is provided only in second internal clock generating circuit 10. Since frequency difference detecting circuit 25 is arranged only in a necessary circuit, the circuit layout area can be reduced as compared with the configuration in which a frequency difference detecting circuit is provided for each internal clock generating circuit in order to equate the configurations.

Frequency difference detecting circuit 25 is implemented using a general configuration such as a frequency/voltage converter, for example.

Figure 7:
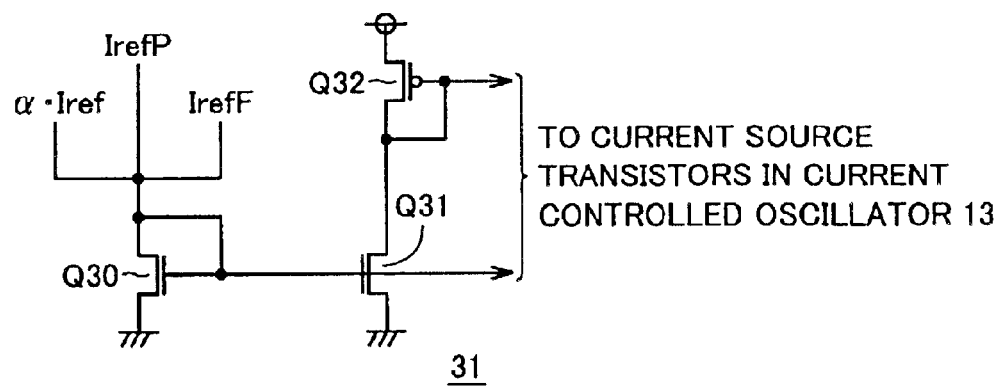
FIG. 7 is a diagram showing an exemplary addition circuit shown in FIG. 6.

FIG. 7 is a diagram showing an exemplary configuration of addition circuit 31 shown in FIG. 6. In FIG. 7, addition circuit 31 includes an N-channel MIS transistor Q30 receiving standard reference current α·Iref, phase error current IrefP and frequency error current IrefF, an N-channel MIS transistor Q31 forming a current mirror circuit with MIS transistor Q30, and a P-channel MIS transistor Q32 supplying current to MIS transistor Q31.

MIS transistor Q30 has its gate and drain connected together and operates as a master stage of the current mirror circuit with a mirror ratio of 1, and the current of the same magnitude flows in MIS transistors Q30 and Q31.

MIS transistor Q32 also has its gate and drain connected with each other. MIS transistors Q31 and Q32 are connected to the gates of the ground-side and power supply-side current source transistors in current controlled oscillator 13 at the next stage, respectively. The current flowing in MIS transistors Q32 and Q31 is used as the operating current of current controlled oscillator 13 to adjust the oscillation frequency of current controlled oscillator 13.

It is noted that the value of coefficient α of multiplier 20 is set to an appropriate value in consideration of a deviation in phase and frequency of the external data of the synchronization object with respect to the basic clock signal, similarly to the first embodiment.

As described above, in accordance with the third embodiment of the present invention, a frequency difference detecting circuit is further provided in the second internal clock generating circuit to detect a frequency difference between the external data and the second internal clock signal as well, and the oscillation frequency is adjusted based on the phase difference and the frequency difference. Thus, a plurality of internal clock signals different in frequency and phase can be generated reliably.

Furthermore, the second internal clock signal is generated by utilizing the reference current of the first internal clock generating circuit and phase comparison and frequency comparison are performed based on this reference current, the stabilized second internal clock signal can be generated at high speed, and in addition the stabilization timings of the internal clock generating circuits can be associated with each other.

[Fourth Embodiment]

Figure 8:
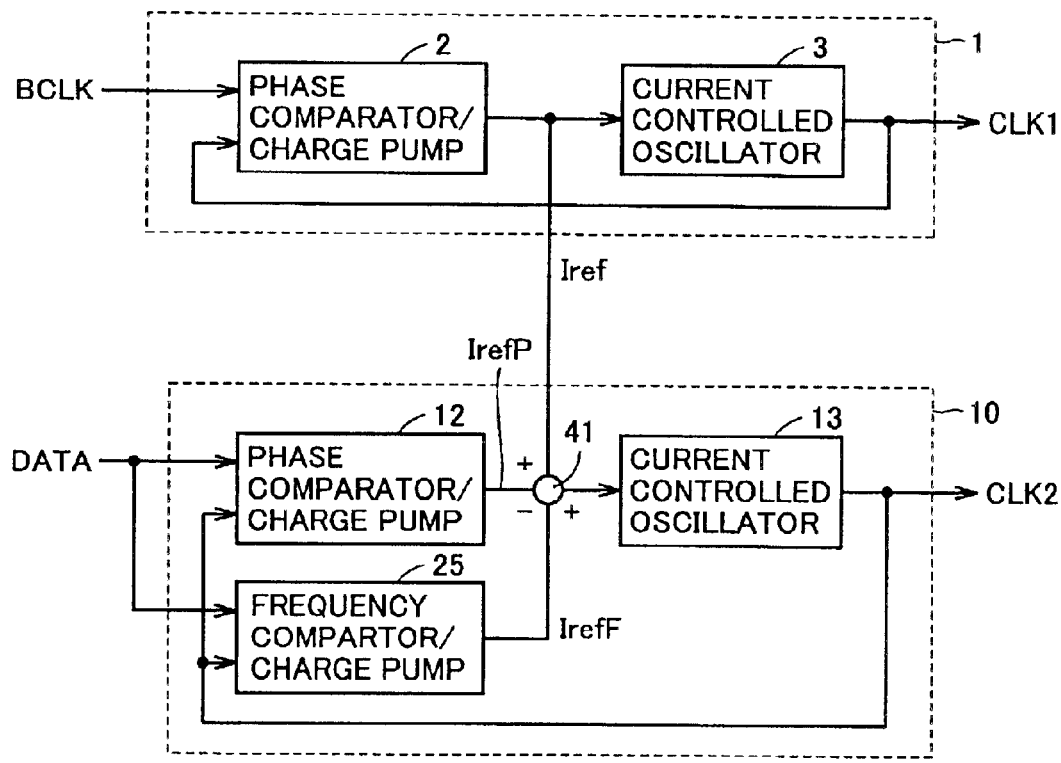
FIG. 8 is a diagram schematically showing a configuration of a semiconductor device in accordance with a fourth embodiment of the present invention.

FIG. 8 is a diagram schematically showing an overall configuration of a semiconductor device in accordance with a fourth embodiment of the present invention. The semiconductor device shown in FIG. 8 differs from the semiconductor device shown in FIG. 6 in configuration in the following point. Reference current Iref generated by first internal clock generating circuit 1 is applied to second internal clock generating circuit 10. Multiplication circuit 20 is not provided. In second internal clock generating circuit 10, there is provided an addition circuit 41 that subtracts phase error current IrefP outputted by phase difference detecting circuit 12 from the sum of reference current Iref and frequency error current IrefF outputted by frequency difference detecting circuit 25.

The other configuration of the semiconductor device shown in FIG. 8 is the same as the configuration shown in FIG. 6, and the corresponding part will be denoted with the same reference numeral and therefore the detail description thereof will not be repeated.

In the semiconductor device shown in FIG. 8, first and second internal clock generating circuits 1 and 10 are substantially equal in the operation characteristics to each other. Second internal clock generating circuit 10 performs an oscillation operation at the frequency substantially equal to the oscillation frequency of first internal clock generating circuit 1 in accordance with reference current Iref, and also adjusts that oscillation frequency in accordance with the phase difference and frequency difference between external data DATA and second internal clock signal CLK2.

In addition circuit 41, reference current Iref is added to frequency error current IrefF, and phase error current IrefP outputted by phase difference detecting circuit 12 is subtracted from that added current.

Therefore, second internal clock signal CLK2 can be generated having a slightly higher frequency and a phase lag with respect to first internal clock signal CLK1.

Also in the configuration shown in FIG. 8, second internal clock signal CLK2 is generated in second internal clock generating circuit 10 with reference to reference current Iref generated by first internal clock generating circuit 1. Therefore, a plurality of internal clock signals can be driven to the stable state reliably, the stabilization timing of the internal clock signal can be determined by the stabilization timing of the internal clock signal that is generated last, and the stabilization timing of the internal clock signals can be set precisely.

Figure 9:
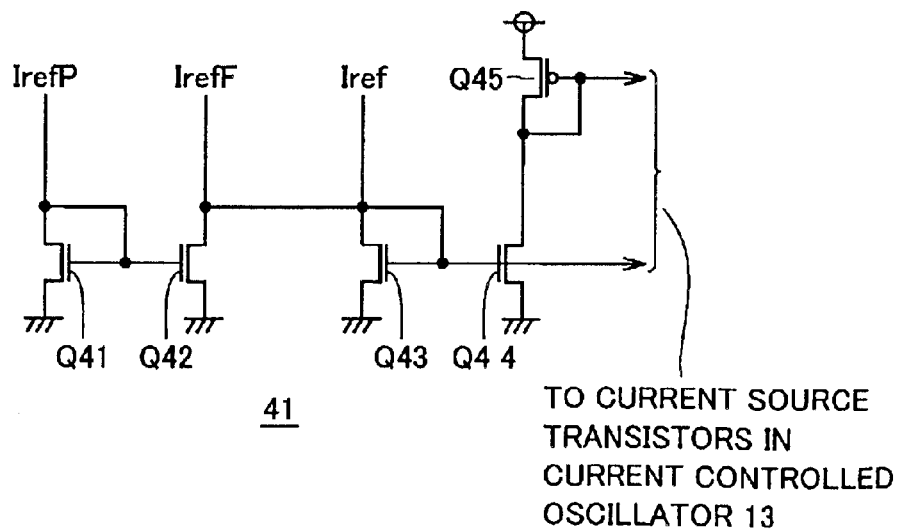
FIG. 9 is a diagram showing an exemplary configuration of an addition circuit shown in FIG. 8.

FIG. 9 is a diagram showing an exemplary configuration of addition circuit 41 shown in FIG. 8. In FIG. 9, addition circuit 41 includes an N-channel MIS transistor Q41 receiving frequency error current IrefP, an N-channel MIS transistor Q42 forming a current mirror circuit with MIS transistor Q41, and an N-channel MIS transistor Q43 provided in parallel with MIS transistor Q42. Reference current Iref and frequency error current IrefF are supplied in common to MIS transistors Q42 and Q43. MIS transistor Q41 has its gate and drain connected together, MIS transistor Q43 has its gate and drain connected together, and MIS transistors Q42 and Q43 have their drains connected together.

Addition circuit 41 further includes an N-channel MIS transistor Q44 forming a current mirror circuit with MIS transistor Q43 with a mirror ratio of 1, and a P-channel MIS transistor Q45 supplying current to MIS transistor Q44. MIS transistor Q45 has its gate and drain connected together. The gates of MIS transistors Q44 and Q45 are connected to the gates of the ground-side and power supply-side current source transistors in current controlled oscillator 13 shown in FIG. 8, respectively.

In addition circuit 41 shown in FIG. 9, MIS transistor Q41 drives frequency error current IrefP, and MIS transistor Q42 discharges phase error current IrefP. Therefore, the current of Iref+IrefF−IrefP flows in MIS transistor Q43. The current, the same in magnitude as the current flowing in MIS transistor Q43, flows in MIS transistor Q44, and the current, the same in magnitude as the driving current of MIS transistor Q44, flows in MIS transistor Q45.

In current controlled oscillator 13, therefore, the current source transistors form the current mirror circuits with the MIS transistor Q45 or Q43, each gate stage responsively operates using the output current of addition circuit 41 as the operating current, and the oscillation frequency is adjusted.

In addition circuit 41, even when the subtraction of the phase error current is performed, the phase detecting operation and phase error current generating operation of phase difference detecting circuit 12 is the same as the case using the addition circuit shown in FIG. 6. When the phase difference is large, the oscillation frequency of current controlled oscillator 13 is significantly reduced and therefore the magnitude of the phase error current outputted by phase difference detecting circuit 13 is increased. In the configuration shown in FIG. 6, when the phase difference is large, the magnitude of the phase error current is increased and the oscillation frequency of current controlled oscillator 13 is increased. Therefore, the circuit configuration of phase difference detecting circuit 12 needs not be changed in the third and fourth embodiments.

As described above, in accordance with the fourth embodiment of the present invention, based on the reference current that determines the oscillation frequency of the first internal clock signal, the phase and frequency of the second internal clock signal are coarsely determined, and based on the comparison in phase and frequency with the external data of the synchronization object, the phase and frequency of the second internal clock signal are adjusted. Therefore, internal clock signals different in frequency and phase can be generated stably.

Furthermore, since a multiplier is not utilized, the number of circuit components is reduced, thereby reducing the layout area.

[Fifth Embodiment]

Figure 10:
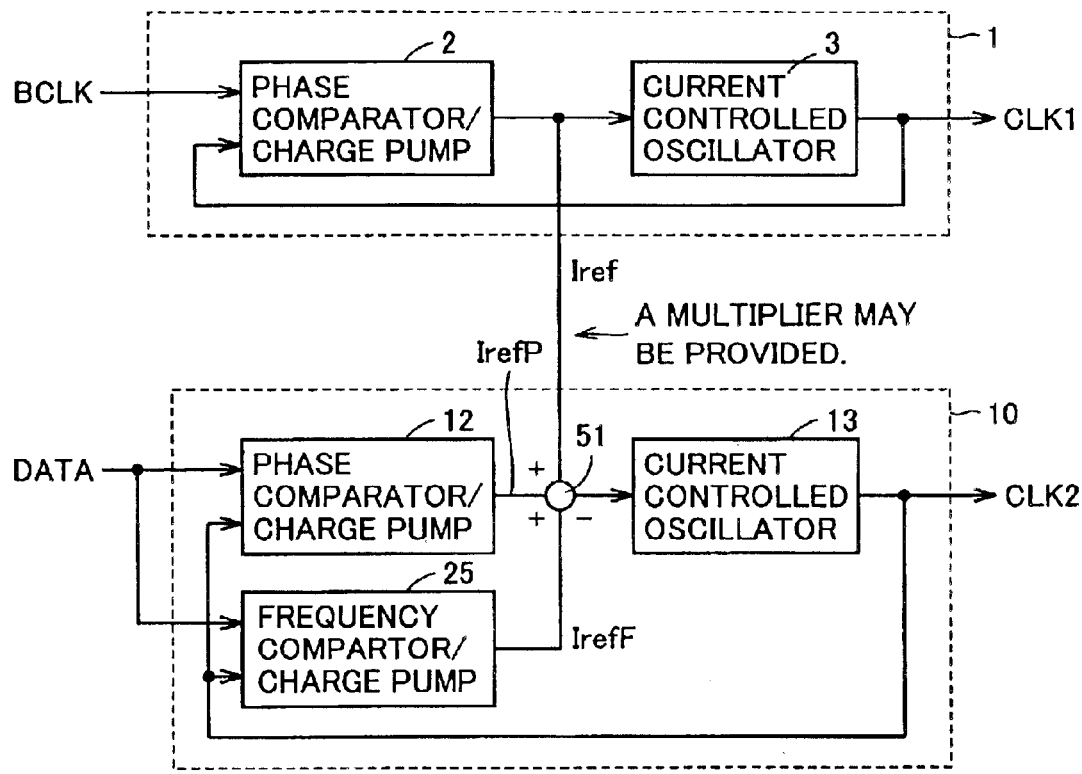
FIG. 10 is a diagram schematically showing a configuration of a semiconductor device in accordance with a fifth embodiment of the present invention.

FIG. 10 is a diagram schematically showing an overall configuration of a semiconductor device in accordance with a fifth embodiment of the present invention. The semiconductor device shown in FIG. 10 differs from the semiconductor device shown in FIG. 8 in configuration in the following point. In second internal clock generating circuit 10, an addition circuit 51 that generates a control current for current controlled oscillator 13, performs addition of reference current Iref from first internal clock generating circuit 1 and phase error current IrefP outputted by phase difference detecting circuit 12 and subtraction of frequency error current IrefF outputted by frequency difference detecting circuit 25. Therefore, current (Iref+IrefP−IrefF) is output from addition circuit 51 and is supplied to current controlled oscillator 13 as a control current that determines the operating current.

The other configuration of the semiconductor device shown in FIG. 10 is the same as the configuration of the semiconductor device shown in FIG. 8, and the corresponding part will be denoted with the same reference numeral and therefore the detail description thereof will not be repeated.

In the semiconductor device shown in FIG. 10, when first internal clock generating circuit 1 is in a stable state, reference current Iref is at a constant value. This reference current Iref is applied to addition circuit 51. Therefore, second internal clock generating circuit 10 performs an oscillation operation using the oscillation frequency determined by reference current Iref, that is the oscillation frequency similar to that of current controlled oscillator 3 included in first internal clock generating circuit 1, as a basic oscillation frequency for generating internal clock signal CLK2.

When the external data DATA is applied, phase difference detecting circuit 12 and frequency difference detecting circuit 25 operate to generate phase error current IrefP and frequency error current IrefF, respectively. The output current of addition circuit 51 is reduced in accordance with frequency error current IrefF outputted by frequency difference detecting circuit 25, while the output current of addition circuit 51 is increased in accordance with phase error current IrefP outputted by phase difference detecting circuit 12. Therefore, second internal clock signal CLK2 is generated as an internal clock signal having a lower frequency and a phase lead with respect to first internal clock signal CLK1.

With frequency difference detecting circuit 25 and phase difference detecting circuit 12, internal clock signal CLK2 phase-locked with external data DATA can be generated by first performing frequency capturing with frequency difference detecting circuit 25 at high speed and then performing phase capturing operation with phase difference detecting circuit 12.

Also in the configuration shown in FIG. 10, a plurality of internal clock signals different in phase and frequency can be generated stably.

Figure 11:
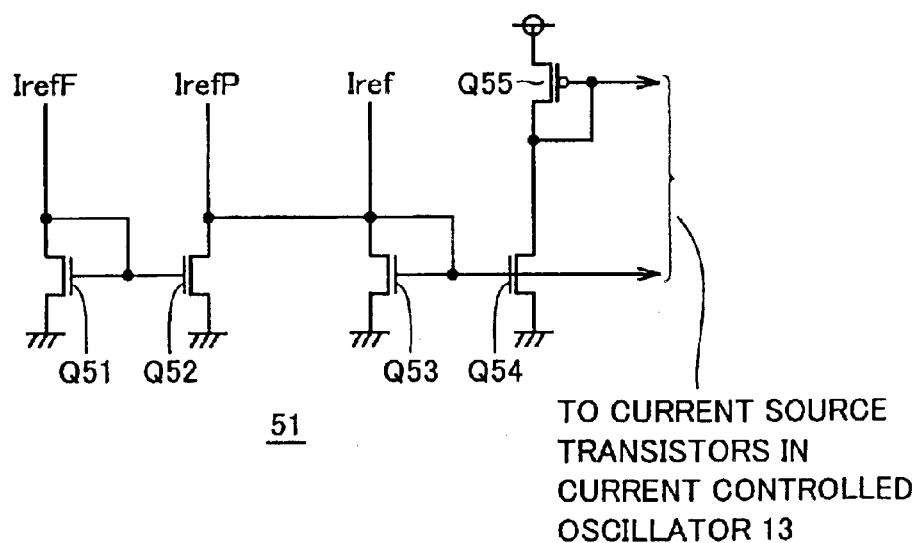
FIG. 11 is a diagram showing an exemplary configuration of an addition circuit shown in FIG. 10.

FIG. 11 is a diagram showing an exemplary configuration of addition circuit 51 shown in FIG. 10. In FIG. 11, addition circuit 51 includes N-channel MIS transistors Q51 and Q52 forming a current mirror circuit, N-channel MIS transistors Q53 and Q54 forming a current mirror circuit, and a P-channel MIS transistor Q55 supplying current to MIS transistor Q54. Each of MIS transistors Q51 and Q53 has its gate and drain connected together. Control current IrefF is applied to MIS transistor Q51, and MIS transistors Q52 and Q53 have their drains connected with each other and are supplied with error currents Iref and IrefP in common.

In the configuration of addition circuit 51 shown in FIG. 11, since MIS transistor Q52 discharges frequency error control current IrefF, current Iref+IrefP−IrefF flows in MIS transistor Q53. The mirror current of the current flowing in MIS transistor Q53 flows through MIS transistors Q54 and Q55. As a result, the driving current amount of the current source transistor of current controlled oscillator 13 shown in FIG. 10 can be adjusted, and the oscillation frequency of current controlled oscillator 13 can be adjusted accordingly.

Alternatively, in the configuration of the semiconductor device shown in FIG. 10, reference current Iref from first internal clock generating circuit 1 may be supplied to addition circuit 51 after being multiplied by a multiplier. A coefficient multiplied by this multiplier may be equal to or greater than unity, or it may be a value smaller than unity.

As described above, in accordance with the fifth embodiment of the present invention, in the second internal clock generating circuit, phase comparison and frequency comparison are performed, the reference current of the first internal clock generating circuit is added to the phase error current in accordance with the phase comparison result and the frequency error current in accordance with the frequency comparison result is subtracted. Therefore, internal clock signals different in frequency and phase can be generated with reference to the oscillation frequency of the basic internal clock signal. Responsively, the internal clock signal phase-locked with the external data having a lower frequency and a phase lead with respect to the first internal clock signal can precisely be generated stably and fast.

[Sixth Embodiment]

Figure 12:
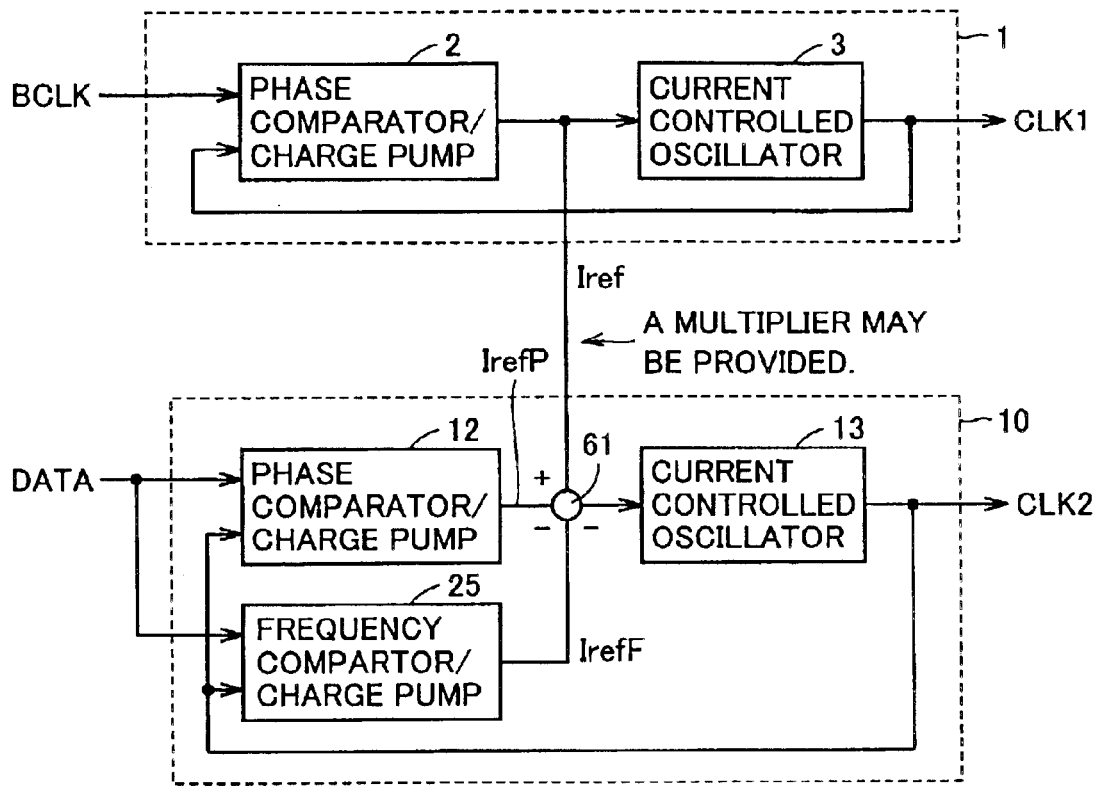
FIG. 12 is a diagram schematically showing a configuration of a semiconductor device in accordance with a sixth embodiment of the present invention.

FIG. 12 is a diagram schematically showing a configuration of a semiconductor device in accordance with a sixth embodiment of the present invention. The semiconductor device shown in FIG. 12 differs from the semiconductor device shown in FIG. 10 in configuration in the following points. In second internal clock generating circuit 10, an addition circuit 61 provided between phase difference detecting circuit 12 and current controlled oscillator 13 subtracts error currents IrefP and IrefF from reference current Iref from first internal clock generating circuit 1. The output current of addition circuit 61 is supplied to current controlled oscillator 13 as a current that determines the operating current of current controlled oscillator 13.

The other configuration of the semiconductor device shown in FIG. 12 is the same as the configuration of the semiconductor device shown in FIG. 10, and the corresponding part will be denoted with the same reference numeral and therefore the detail description thereof will not be repeated.

In the semiconductor device shown in FIG. 12, in second internal clock generating circuit 10, current controlled oscillator 13 first performs an oscillation operation in accordance with reference current Iref. In this state, the oscillation frequency is adjusted based on a result of comparison in phase and frequency between external data DATA and internal clock signal CLK2.

The oscillation frequency of current controlled oscillator 13 is adjusted in a direction to be lower than the oscillation frequency of current controlled oscillator 3. Specifically, the oscillation operation of current controlled oscillator 13 is controlled such that second internal clock signal CLK2 is slightly lower in frequency than and slightly lags in phase behind first internal clock signal CLK1. Therefore, internal clock signal CLK2 finally becomes a signal phase-locked with external data DATA having a slightly lower frequency and a slight phase lag with respect to first internal clock signal CLK1.

Also in the semiconductor device shown in FIG. 12, frequency difference detecting circuit 25 is used to perform pull-in between external data DATA and internal clock signal CLK2 at high speed based on the frequency difference, and further a phase adjustment is made in accordance with the output current of phase difference detecting circuit 12. Therefore, internal clock signal CLK2 phase-locked with external data DATA can be generated at high speed.

Also in the semiconductor device shown in FIG. 12, reference current Iref generated by first internal clock generating circuit 1 may be multiplied by α using a multiplier and supplied to second internal clock generating circuit 10. In this case, such an internal clock signal CLK2 can be generated that has a higher frequency and has a phase lead with respect to first internal clock signal CLK1. Therefore, the multiplication coefficient of the multiplier may be equal to or greater than unity or it may be smaller than unity. The value of the multiplication coefficient of the multiplier may be determined appropriately in accordance with the phase relation between basic clock signal BCLK and external data DATA.

Figure 13:
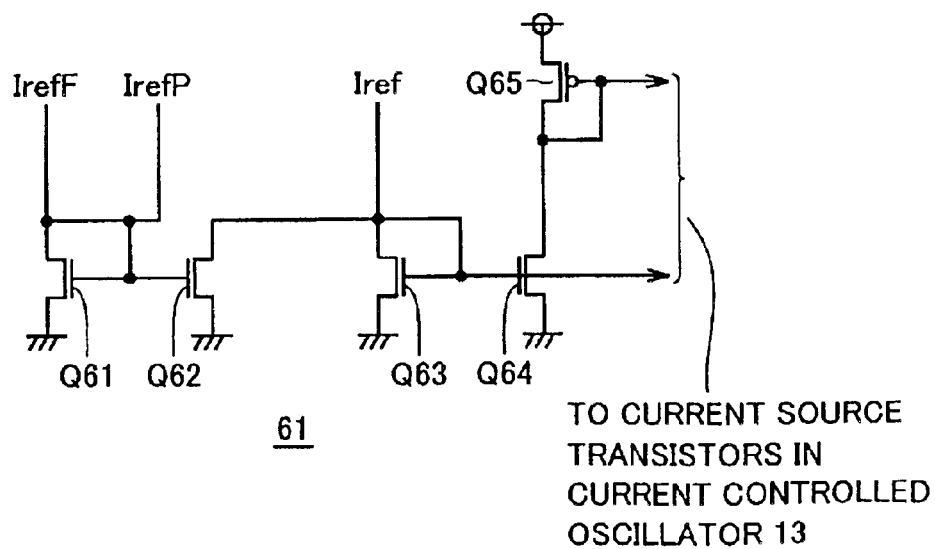
FIG. 13 is a diagram showing an exemplary configuration of an addition circuit shown in FIG. 12.

FIG. 13 is a diagram showing an exemplary configuration of addition circuit 61 shown in FIG. 12. In FIG. 13, addition circuit 61 includes an N-channel MIS transistor Q61 receiving reference current Iref and phase error current IrefP, an N-channel MIS transistor Q62 forming a current mirror circuit with MIS transistor Q61, and an N-channel MIS transistor Q63 provided in parallel with MIS transistor Q62. MIS transistor Q63 has its gate and drain connected together and also connected to the drain of MIS transistor Q62. Reference current Iref is applied in common to MIS transistors Q62 and Q63.

Addition circuit 61 further includes an N-channel MIS transistor Q64 forming a current mirror circuit with MIS transistor Q63, and a P-channel MIS transistor Q65 supplying current to MIS transistor Q64. MIS transistor Q65 has its gate and drain connected with each other. The gates of MIS transistors Q64 and Q65 are connected to the gates of ground-side and power supply-side current source transistors, respectively, included in current controlled oscillator 13 shown in FIG. 12.

In addition circuit 61 shown in FIG. 13, MIS transistor Q61 drives current Iref+IrefP. Therefore, the current with the same magnitude as MIS transistor Q61 flows in MIS transistor Q62, and the remaining current flows into MIS transistor Q63. Thus, the current of the magnitude Iref−IrefF−IrefP flows in MIS transistor Q63.

Current of the same magnitude as in MIS transistor Q63 flows in MIS transistor Q64. Therefore, through these MIS transistors Q64 and Q65, current Iref−IrefF−IrefP is supplied as the operating current to each gate stage of current controlled oscillator 13 so that the oscillation frequency is adjusted.

It is noted that currents IrefF, IrefP and Iref are each generated with the configuration similar to the circuit configuration shown in the foregoing embodiment 1 or 2 (using a current mirror circuit).

As described above, in accordance with the sixth embodiment of the present invention, the current corresponding to the difference in phase and frequency between the second internal clock signal and the external data is subtracted from the reference current of the first internal clock generating circuit, and the oscillation frequency of the oscillator that generates the second internal clock signal is adjusted in accordance with a result of subtraction. Therefore, after the stable operation of the first internal clock generating circuit, the second internal clock signal different from the first internal clock signal in frequency and/or phase can be generated fast and stably with high accuracy.

[Seventh Embodiment]

Figure 14:
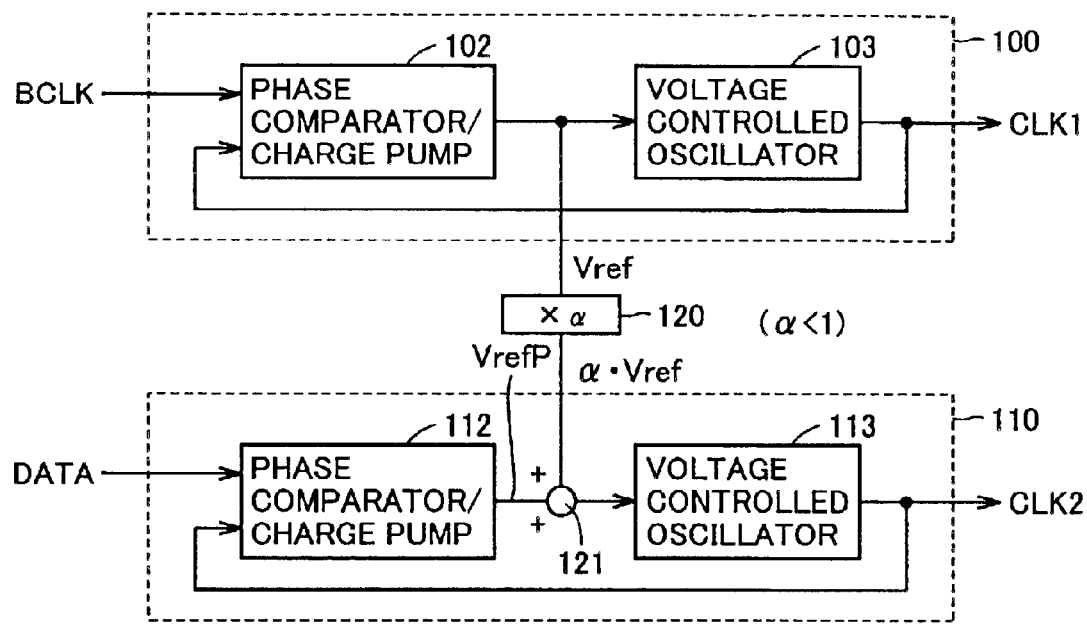
FIG. 14 is a diagram schematically showing a configuration of a semiconductor device in accordance with a seventh embodiment of the present invention.

FIG. 14 is a diagram schematically showing a configuration of a semiconductor device in accordance with a seventh embodiment of the present invention. In FIG. 14, the semiconductor device includes a first internal clock generating circuit 100 generating first internal clock signal CLK1 phase-locked with basic clock signal BCLK, and a second internal clock generating circuit 110 generating second internal clock signal CLK2 phase-locked with external data DATA.

First internal clock generating circuit 100 includes a phase difference detecting circuit 102 comparing the phases of first internal clock signal CLK1 and basic clock signal BCLK and generating reference voltage Vref in accordance with a result of comparison, and a voltage controlled oscillator 103 performing an oscillation operation with its oscillation frequency determined in accordance with reference voltage Vref outputted by phase difference detecting circuit 102 for generating first internal clock signal CLK1.

Phase difference detecting circuit 102 includes a phase comparator for comparing the phases of internal clock signal CLK1 and basic clock signal BCLK, and a charge pump performing charge pump operation in accordance with the output signal of the phase comparator for generating a voltage corresponding to the phase error. A loop filter performs a filtering operation on the error voltage generated by the charge pump to generate a control voltage (reference voltage) Vref for voltage controlled oscillator 103.

Reference voltage Vref is multiplied by coefficient α using a multiplication circuit 120 to be applied to second internal clock generating circuit 110.

Second internal clock generating circuit 110 includes a phase difference detecting circuit 112 performing a phase comparison between second internal clock signal CLK2 and external DATA for generating control voltage VrefP in accordance with a result of phase comparison, an addition circuit 121 performing an addition of control voltage VrefP outputted by phase difference detecting circuit 112 and control voltage α·Vref outputted by multiplication circuit 120, and a voltage controlled oscillator 113 performing an oscillation operation with its oscillation frequency determined in accordance with the voltage outputted by addition circuit 121 for generating second internal clock signal CLK2.

Multiplication circuit 120 multiplies control voltage Vref by coefficient α to generate control voltage α·Vref. Here, coefficient α is a number smaller than one.

Phase difference detecting circuit 112 includes a phase comparator comparing the phases of external data DATA and second internal clock signal CLK2, and a charge pump performing charge pump operation in accordance with the output signal of the phase comparator to generate an error voltage. A loop filter performs filtering processing on the voltage generated by the charge pump to generate phase error voltage VrefP.

Voltage controlled oscillators 103, 113 and phase difference detecting circuits 102, 112 are similar in configuration to those used in a normal internal clock generating circuit.

Furthermore, the operation characteristics of first and second internal clock generating circuits 100 and 110 are substantially the same.

In the semiconductor device shown in FIG. 14, voltage controlled oscillators 103 and 113 are used in place of a current controlled oscillator in first and second internal clock generating circuits 100 and 110. Voltage controlled oscillators 103 and 113 have also their oscillation frequencies determined in accordance with the respective control voltages. A configuration of a multi-vibrator may be used as the configuration of voltage controlled oscillators 103 and 113. Alternatively, a ring oscillator having its operating current determined by a control voltage may be used.

In the following configuration of the semiconductor device, voltage controlled oscillators 103 and 113 each have the oscillation frequency becoming higher as the level of the control voltage becomes higher. However, these voltage controlled oscillators 103 and 113 may be configured such that the oscillation frequency is lowered as the control voltage becomes higher.

In the configuration shown in FIG. 14, simply, the voltage control is performed in place of the current control in the configuration of the semiconductor device in accordance with the foregoing first embodiment. First internal clock generating circuit 100 performs an oscillation operation, and when first internal clock signal CLK1 is phase-locked with basic clock signal BCLK, reference voltage Vref is maintained at a constant voltage level. The starting oscillation frequency of voltage controlled oscillator 113 is determined based on reference voltage Vref supplied through multiplication circuit 120, and a control voltage is generated based on a phase comparison between external data DATA and second internal clock signal CLK2 to adjust the oscillation frequency of voltage controlled oscillator 103.

Specifically, second internal clock generating circuit 110 is supplied with control voltage α·Vref from multiplication circuit 120. Therefore, when external data DATA is not applied, voltage controlled oscillator 113 has the same operation characteristics as voltage controlled oscillator 103 and therefore, performs the oscillation operation at a frequency lower than the oscillation frequency of voltage controlled oscillator 103 to generate internal clock signal CLK2.

When external data DATA is applied, phase difference detecting circuit 112 performs a phase comparison to generate phase error voltage VrefP based on charge pump operation in accordance with the comparison result. Addition circuit 121 generates control voltage VrefP+α·Vref to be applied to voltage controlled oscillator 113. Therefore, voltage controlled oscillator 113 has its oscillation operation set in accordance with the control voltage from addition circuit 121 and generates internal clock signal CLK2 phase-locked with external data DATA.

In this case, external data DATA has its phase slightly different from internal clock signal CLK1, the varying range of control voltage VrefP outputted by phase different detecting circuit 112 is small, and voltage controlled oscillator 113 adjusts its oscillation frequency from the original oscillation frequency of control voltage α·Vref to establish a phase lock between internal clock signal CLK2 and external data DATA at high speed.

Therefore, also when voltage controlled oscillators 103 and 113 are used to generate internal clocks, the initial oscillation frequency of the second internal clock generating circuit is set based on reference voltage Vref of first internal clock generating circuit 100 and the phase lock between second internal clock signal CLK2 and external data DATA is established. As a result, internal clock signals CLK1 and CLK2 having phases slightly different from each other can be generated stably at high speed.

Particularly, since the oscillation frequency of voltage controlled oscillator 113 is gradually increased by addition of control voltage VrefP and α·Vref in addition circuit 121, internal clock signal CLK2 has its phase advanced relative to the initial state so that phase lock between external data DATA and internal clock signal CLK2 is established.

Figure 15:
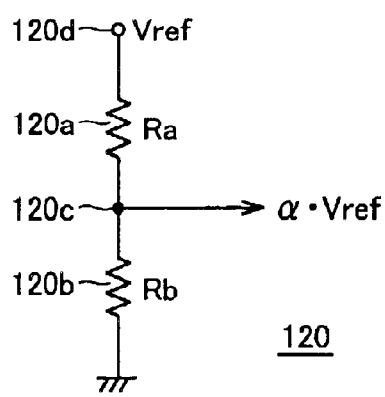
FIG. 15 is a diagram showing an exemplary configuration of a multiplication circuit shown in FIG. 14.

FIG. 15 is a diagram showing an exemplary configuration of multiplication circuit 120 shown in FIG. 14. In FIG. 15, multiplication circuit 120 includes resistance elements 120a and 120b connected in series between a node 120d and a ground node. Node 120d receives reference voltage Vref. Control voltage α·Vref is outputted from a node 120c between resistance elements 120a and 120b.

Multiplication circuit 120 shown in FIG. 15 is a resistance voltage dividing circuit to divide reference voltage Vref at a voltage dividing ratio of α=Rb/(Ra+Rb).

Figure 16:
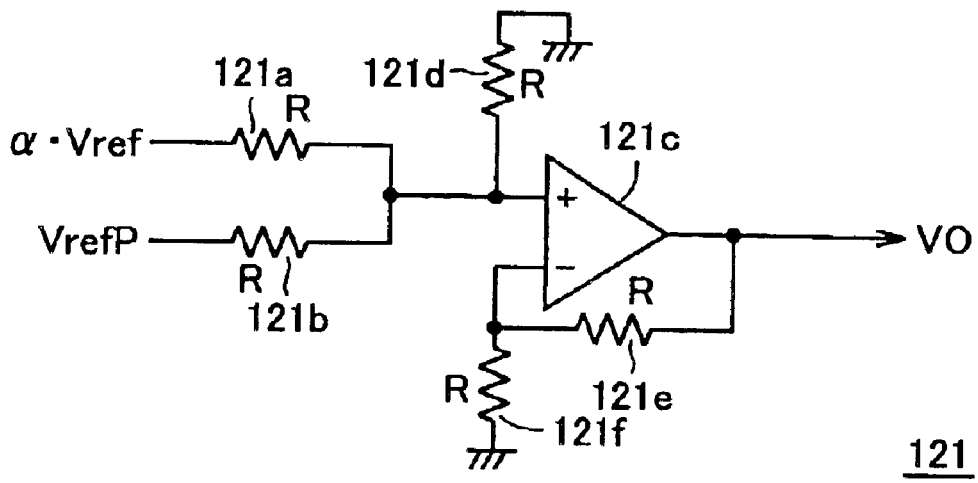
FIG. 16 is a diagram showing an exemplary configuration of an addition circuit shown in FIG. 14.

FIG. 16 is a diagram showing an exemplary configuration of addition circuit 121 shown in FIG. 14. In FIG. 16, addition circuit 121 includes a resistance element 121a receiving standard reference voltage α·Vref, a resistance element 121b receiving phase error voltage VrefP, an operational amplifier 121c having its positive input connected to resistance elements 121a and 121b in common and its negative input connected to a ground node through a resistance element 121f and having its output connected to the negative input through a resistance element 121e, and a resistance element 121d connected between the positive input of operational amplifier 121d and the ground node. Resistance elements 121a to 121f each have a resistance value R.

Operational amplifier 121c outputs a control voltage VO to voltage controlled oscillator 113 shown in FIG. 14.

In the configuration of operational amplifier 121c, resistance elements 121a to 121f all have the same resistance value R. Therefore, this operational amplifier 121c operates as an addition circuit and has its output voltage VO obtained by VrefP+α·Vref.

Figure 17:
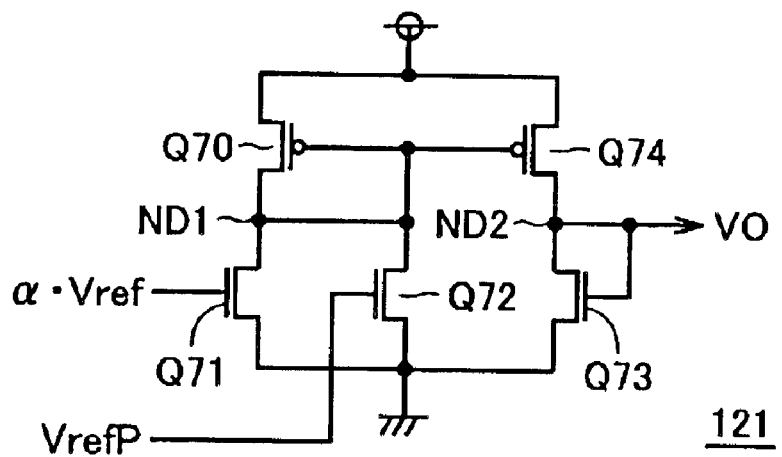
FIG. 17 is a diagram showing a modification of the addition circuit shown in FIG. 14.

FIG. 17 is a diagram showing a modification of addition circuit 121 shown in FIG. 14. In FIG. 17, addition circuit 121 includes a P-channel MIS transistor Q70 connected between a power supply node and a node ND1 and having its gate connected to node ND1, an N-channel MIS transistor Q71 connected between node ND1 and the ground node and receiving at its gate standard reference voltage α·Vref, an N-channel MIS transistor Q72 connected between node ND1 and the ground node and receiving at its gate phase error voltage VrefP, an N-channel MIS transistor Q73 connected between a node ND2 and the ground node and having its gate connected to node ND2, and a P-channel MIS transistor Q74 connected between the power supply node and node ND2 and having its gate connected to node ND1. Control voltage VO is outputted from node ND2.

MIS transistors Q70 and Q74 form a current mirror circuit of a mirror ratio 1, and the mirror current, having the same magnitude as the current flowing through MIS transistor Q70, flows through MIS transistor Q74. Therefore, when this phase error voltage VrefP is a ground voltage level and MIS transistor Q72 is in a nonconductive state, current of the same magnitude flows in MIS transistors Q71 and Q73. In this state, when MIS transistors Q71 and Q73 are the same in size, the output voltage VO at node ND2 is the same in level as standard reference voltage α·Vref.

When the voltage level of phase error voltage VrefP rises, the current flowing through MIS transistor Q72 is increased and the current flowing through MIS transistor Q70 is responsively increased. Therefore, the mirror current flowing through MIS transistor Q74 is also increased and the voltage level of node ND2 rises. Therefore, voltage VO from node ND2 rises in response to the rise of the voltage level of phase error voltage VrefP. A control voltage equivalent to VO=α·Vref+VrefP can be generated and supplied to voltage controlled oscillator 113.

As described above, in accordance with the seventh embodiment of the present invention, even when a voltage controlled oscillator is used as an oscillation circuit, based on the reference voltage for generating a clock signal, the operation of generating another internal clock signal is adjusted. Therefore, a plurality of internal clock signals having the same frequency with different phases can be produced fast and stably.

It is noted that the phase relation between internal clock signal CLK2 and internal clock signal CLK1 is any and the phase lag/lead is set in accordance with the voltage level of phase error voltage VrefP.

[Eighth Embodiment]

Figure 18:
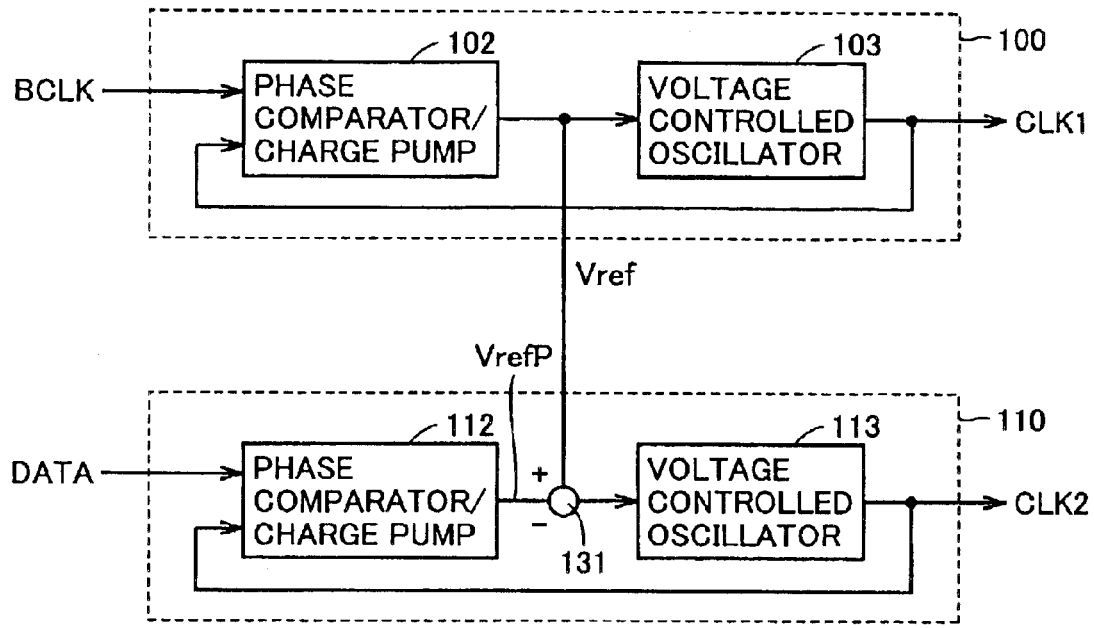
FIG. 18 is a diagram schematically showing a configuration of a semiconductor device in accordance with an eighth embodiment of the present invention.

FIG. 18 is a diagram schematically showing an overall configuration of a semiconductor device in accordance with an eighth embodiment of the present invention. The semiconductor device shown in FIG. 18 differs from the semiconductor device shown in FIG. 14 in the following point. Reference voltage Vref from first internal clock generating circuit 100 is directly provided to second internal clock generating circuit 110, not through a multiplier. In second internal clock generating circuit 110, there is provided an addition circuit 131 subtracting phase error voltage VrefP outputted by phase difference detecting circuit 112 from reference voltage Vref. The output voltage of addition circuit 131 is applied to voltage controlled oscillator 113 as an oscillation frequency control voltage. The other configuration of the semiconductor device shown in FIG. 18 is the same as the configuration shown in FIG. 14, and the corresponding part will be denoted with the same reference numeral and therefore the detail description thereof will not be repeated.

Also in the configuration of the semiconductor device shown in FIG. 18, in the stable operation of first internal clock generating circuit 100, reference voltage Vref is maintained at a constant voltage level. Therefore, second internal clock generating circuit 110 performs a phase adjusting operation to adjust the voltage level of control voltage VrefP with reference to reference voltage Vref. Thus, voltage controlled oscillator 113 performs an oscillation operation in accordance with control voltage Vref–VrefP from addition circuit 131 to establish phase lock between external data DATA and internal clock signal CLK2. Second internal clock generating circuit 110 can perform an oscillation operation in the vicinity of the oscillation frequency of first internal clock generating circuit 100 and can produce internal clock signal CLK2 phase-locked with external data DATA fast and stably.

Voltage controlled oscillator 113 has its oscillation frequency lowered in accordance with phase error voltage VrefP by delaying the phase of internal clock signal CLK2.

Phase difference detecting circuit 112 shown in FIGS. 14 and 18 has the same configuration. When the phase difference between second internal clock signal CLK2 and external data DATA is large, phase error voltage VrefP is raised. In this case, in the configuration shown in FIG. 14, the oscillation frequency of voltage controlled oscillator 113 is made higher, while in the configuration of FIG. 18, the oscillation frequency of voltage controlled oscillator 113 is made lower. At the initial comparison operation, the frequency of internal clock signal CLK2 is set lower in the configuration shown in FIG. 14 and higher in the configuration shown in FIG. 18. Therefore, phase difference detecting circuit 112 of the same configuration can be used in the configurations shown in FIG. 14 and FIG. 18, to generate internal clock signal CLK2 slightly phase-shifted from basic clock signal BCLK.

Figure 19:
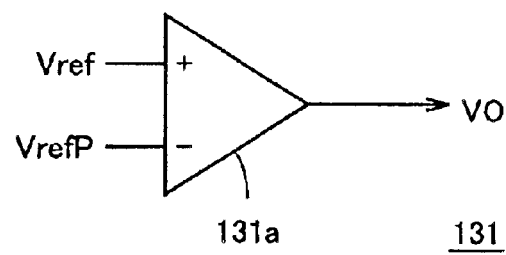
FIG. 19 is a diagram showing an exemplary configuration of an addition circuit shown in FIG. 18.

FIG. 19 is a diagram showing an exemplary configuration of addition circuit 131 shown in FIG. 18. In FIG. 19, addition circuit 131 includes a differential amplifying circuit 131a receiving reference voltage Vref at its positive input and receiving control voltage VrefP at its negative input. The gain of differential amplifying circuit 131a is set to 1, or unity to produce voltage Vref–VrefP as output voltage VO.

It is noted that a current mirror type differential amplifying circuit as shown in FIG. 17 may be used in place of this differential amplifying circuit 131a.

As described above, in accordance with the eighth embodiment of the present invention, the oscillation frequency of the voltage controlled oscillator that produces the second internal clock signal is adjusted by the reference voltage Vref for setting the oscillation frequency of the first internal clock generating circuit and the phase error voltage produced in accordance with phase comparison between the internal clock signal and the external data, and two internal clock signals different in phase can be produced easily and stably.

[Ninth Embodiment]

Figure 20:
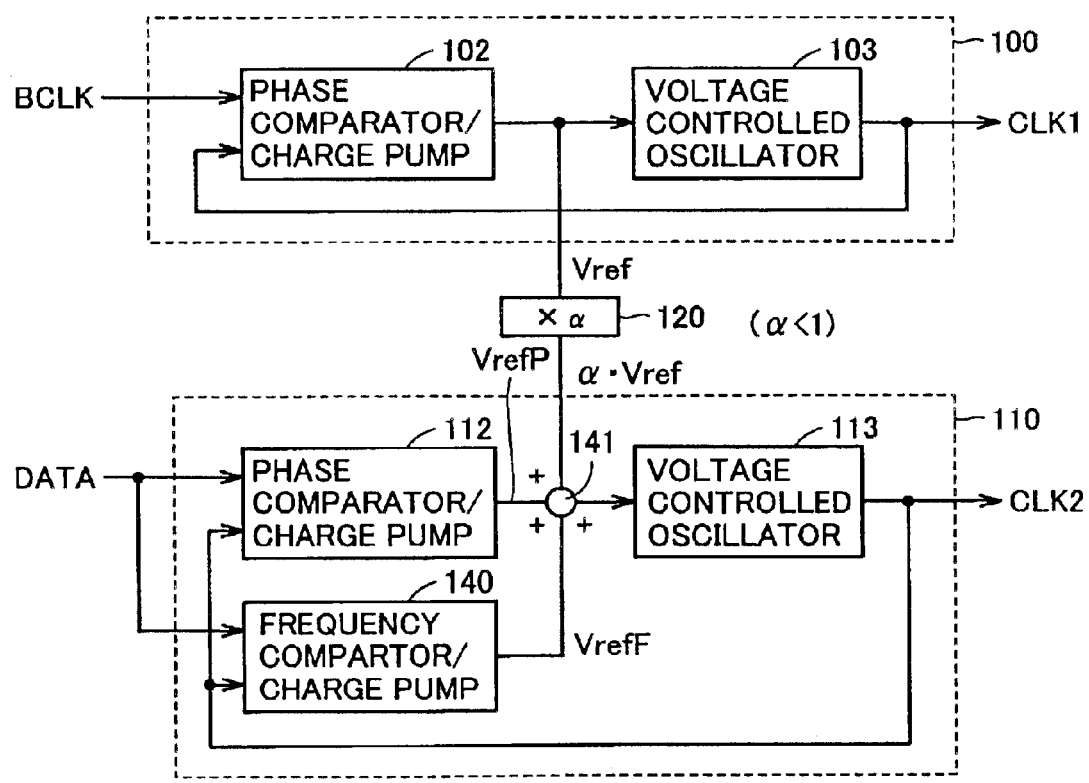
FIG. 20 is a diagram schematically showing a configuration of a semiconductor device in accordance with a ninth embodiment of the present invention.

FIG. 20 is a diagram schematically showing an overall configuration of a semiconductor device in accordance with a ninth embodiment of the present invention. The semiconductor device shown in FIG. 20 differs from the semiconductor device shown in FIG. 14 in configuration in the following point. In second internal clock generating circuit 110, there is provided a frequency difference detecting circuit 140 performing frequency comparison between second internal clock signal CLK2 and external data DATA for producing frequency error voltage VrefF based on a result of comparison, and an addition circuit 141 performing an addition of control voltage α·Vref outputted by multiplication circuit 120, control voltage VrefP outputted by phase difference detecting circuit 112 and control voltage VrefF outputted by frequency difference detecting circuit 140, for application to voltage controlled oscillator 113 as the control voltage.

Frequency difference detecting circuit 140 includes a frequency comparator for comparing the frequencies of external data DATA and second internal clock signal CLK2, and a charge pump performing charge pump operation in accordance with the output signal of the frequency comparator for generating a phase error voltage. The voltage produced by the charge pump is passed through a loop filter to finally produce frequency error voltage VrefF. When the frequency difference is large, frequency error voltage VrefF is raised.

The other configuration of the semiconductor device shown in FIG. 20 is the same as the semiconductor device shown in FIG. 14, and the corresponding part will be denoted with the same reference numeral and the detail description thereof will not be repeated.

In the case of the semiconductor device shown in FIG. 20, when first internal clock generating circuit 100 performs a stable operation, a constant reference voltage Vref is produced and control voltage α·Vref of a constant magnitude is produced also from multiplication circuit 120, accordingly. Therefore, in this state, in second internal clock generating circuit 110, voltage controlled oscillator 113 performs an oscillation operation at an oscillation frequency slightly lower than that of voltage controlled oscillator 103 included in first internal clock generating circuit 100.

Phase comparison and frequency comparison between the externally applied data DATA and second internal clock signal CLK2 are performed to produce phase error voltage VrefP and frequency error voltage VrefF, respectively. Addition circuit 141 produces and applies control voltage VrefP+VrefF+α·Vref to voltage controlled oscillator 113 to increase the oscillation frequency thereof. Finally, this data DATA and internal clock signal CLK2 match in phase and frequency.

In the semiconductor device shown in FIG. 20, internal clock signal CLK2 phase-locked with external data DATA different in frequency and phase can be generated in the vicinity of the oscillation frequency of first internal clock generating circuit 100.

As the configuration of addition circuit 141, an operational amplifier can be utilized as similar to the configuration shown in FIG. 16. The positive input of operational amplifier 121d shown in FIG. 16 receives voltages α·Vref, VrefP and VrefF in parallel through the respective resistance elements.

Furthermore, the comparison circuit shown in FIG. 17 can be utilized as addition circuit 141. An N-channel MIS transistor receiving at its gate control voltage VrefF is further provided in parallel with MIS transistors Q71 and Q72. As a result, the voltage corresponding to the sum of three voltages can be produced as the output voltage.

As described above, in accordance with the ninth embodiment of the present invention, the second internal clock generating circuit performs the oscillation operation on the basis of the voltage based on the reference voltage from the first internal clock generating circuit, and has the oscillation frequency thereof adjusted through phase and frequency comparison. Thus, the second internal clock signal having different frequency and phase from the first internal clock signal can be produced stably and fast.

[Tenth Embodiment]

Figure 21:
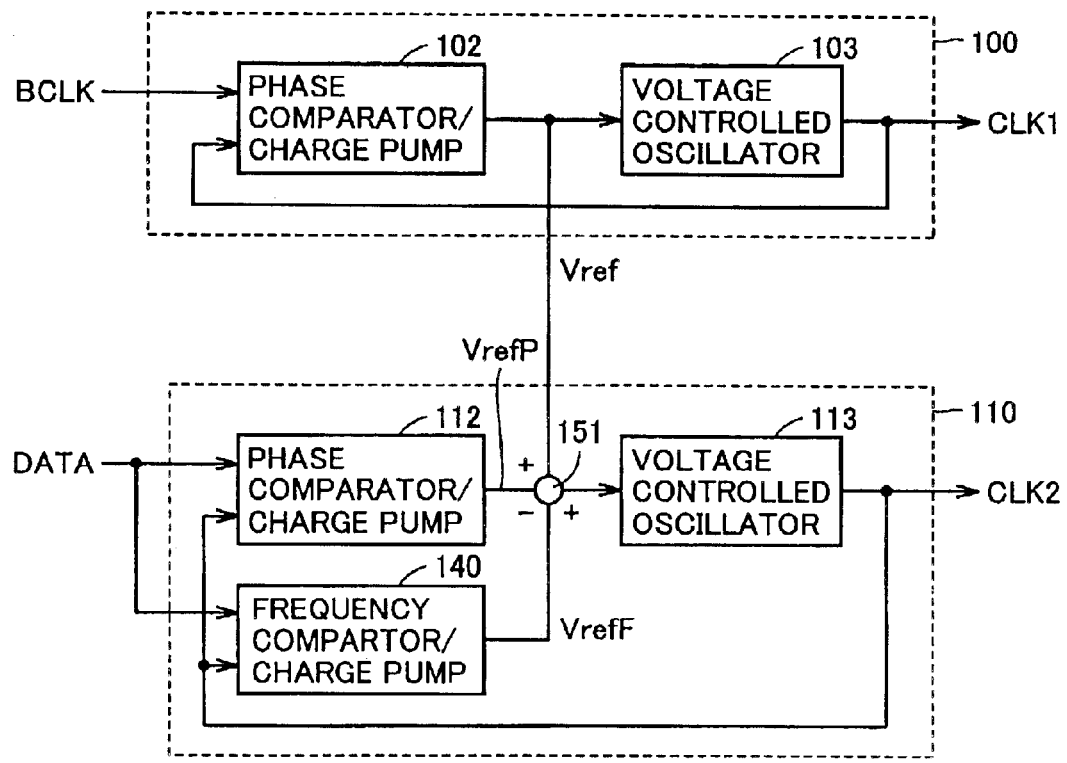
FIG. 21 is a diagram showing an overall configuration of a semiconductor device in accordance with a tenth embodiment of the present invention.

FIG. 21 is a diagram schematically showing an overall configuration of a semiconductor device in accordance with a tenth embodiment of the present invention. The semiconductor device shown in FIG. 21 differs from the semiconductor device shown in FIG. 20 in configuration in the following point. Second internal clock generating circuit 110 directly receives reference voltage Vref from first internal clock generating circuit 100, not through multiplication circuit 120. The control voltage for voltage controlled oscillator 113 is produced by an addition circuit 151. Addition circuit 151 performs an addition of reference voltage Vref and frequency error voltage VrefF outputted by frequency difference detecting circuit 140 and performs a subtraction of phase error voltage VrefP outputted by phase difference detecting circuit 112 to produce the control voltage.

The other configuration of the semiconductor device shown in FIG. 21 is the same as the configuration of the semiconductor device shown in FIG. 20, and the corresponding part will be denoted with the same reference numeral and therefore the detail description thereof will not be repeated.

In the configuration of the semiconductor device shown in FIG. 21, in stabilization of first internal clock generating circuit 100, reference voltage Vref is maintained at a constant voltage level. In second internal clock generating circuit 110, voltage controlled oscillator 113 inside thereof performs an oscillation operation using reference voltage Vref as a control reference voltage. When frequency difference detecting circuit 140 detects a frequency difference, it changes the voltage level of frequency error voltage VrefF. When phase difference detecting circuit 112 detects a phase difference, it adjusts the voltage level of phase error voltage VrefP. When external data DATA and second internal clock signal CLK2 match in frequency and phase, the voltage levels of error voltages VrefP and VrefF are held constant.

Voltage controlled oscillator 113 performs an oscillation operation with its oscillation frequency determined in accordance with control voltage Vref−VrefP+VrefF.

Also in the configuration shown in FIG. 21, when external data DATA differs from, but close to basic clock signal BCLK in frequency and phase, internal clock signal CLK2 phase-locked with external data DATA can be produced fast and stably.

In the semiconductor device shown in FIG. 21, internal clock signal CLK2 has its frequency increased by frequency difference detecting circuit 140 and has its phase delayed by phase difference detecting circuit 112.

Figure 22:
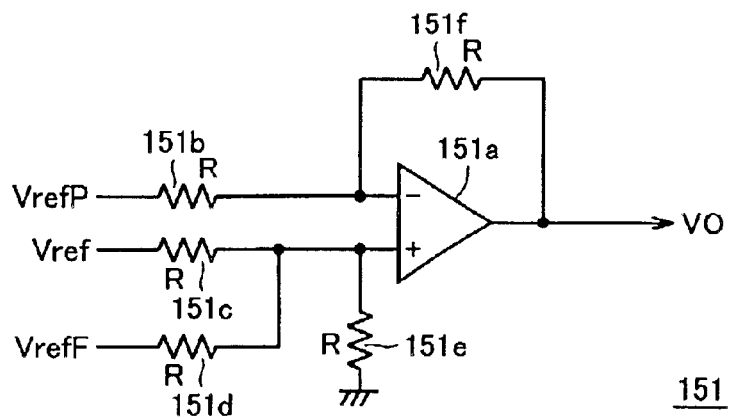
FIG. 22 is a diagram showing an exemplary configuration of an addition circuit shown in FIG. 21.

FIG. 22 is a diagram showing an exemplary configuration of addition circuit 151 shown in FIG. 21. In FIG. 22, addition circuit 151 includes a resistance element 151b receiving phase error voltage VrefP, a resistance element 151c receiving reference voltage Vref, a resistance element 151d receiving frequency error voltage VrefF, an operational amplifier 151a having its negative input connected to resistance element 151b and its positive input connected to resistance elements 151c and 151d in common, a resistance element 151e connected between the positive input of operational amplifier 151a and a ground node, and a resistance element 151f connected between the output and the negative input of operational amplifier 151a. These resistance elements 151b to 151f each have a resistance value R.

In the case of the configuration of addition circuit 151 shown in FIG. 22, the voltage levels of the positive input and the negative input are the same in operational amplifier 151a, and the current flowing in resistance elements 151b and 151f is same. Therefore, as the resistance value of resistance elements 151b to 151f is equal, operational amplifier 151a produces a voltage corresponding to the difference between the sum of the voltages received at the positive input and the voltage received at the negative input, as output voltage VO. In other words, voltage (Vref+VrefF−VrefP) can be obtained as output voltage VO.

Figure 23:
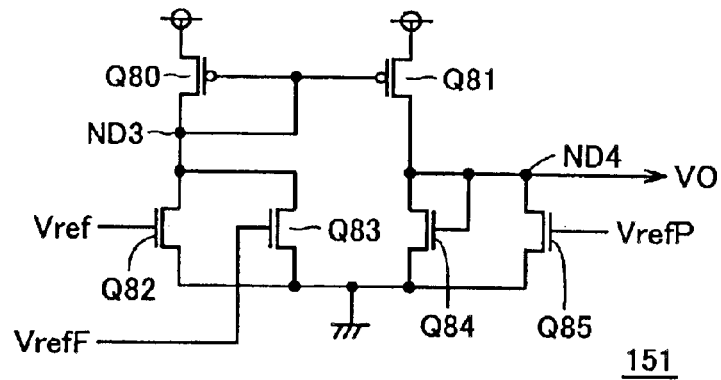
FIG. 23 is a diagram showing a modification of the addition circuit shown in FIG. 21.

FIG. 23 is a diagram showing a modification of addition circuit 151 shown in FIG. 21. In FIG. 23, addition circuit 151 includes a P-channel MIS transistor Q80 connected between a power supply node and a node ND3 and having its gate connected to node ND3, an N-channel MIS transistor Q82 connected between node ND3 and a ground node and receiving at its gate reference voltage Vref, an N-channel MIS transistor Q83 connected between node ND3 and the ground node and receiving at its gate frequency error voltage VrefF, a P-channel MIS transistor Q81 connected between a node ND4 and the ground node and having its gate connected to node ND3, an N-channel MIS transistor Q84 connected between node ND4 and the ground node and having its gate connected to node ND4, and an N-channel MIS transistor Q85 connected between node ND4 and the ground node and receiving at its gate phase error voltage VrefP. Control voltage VO is produced at node ND4 and is supplied to voltage controlled oscillator 113 shown in FIG. 21.

In the configuration of addition circuit 151 shown in FIG. 23, when both of error voltages VrefF and VrefP are at a ground voltage level, a voltage of the same magnitude as reference voltage Vref is produced at node ND4. In other words, MIS transistors Q80 and Q81 form a current mirror circuit, have the same size, and allow the current of the same magnitude to pass through. MIS transistors Q82 and Q84 are the same in size and in the current driving ability.

When the voltage level of frequency error voltage VrefF rises, the current flowing through node ND3 is increased, and the amount of the current supplied to node ND4 through MIS transistor Q81 is increased accordingly. At this state, when the voltage level of phase error voltage VrefP rises, the discharging current of MIS transistor Q85 is increased, the driving current of MIS transistor Q84 is reduced, and the voltage level at node ND4 is reduced. As a result, output voltage VO corresponding to voltage Vref+VrefF−VrefP can be produced equivalently.

As described above, in accordance with the tenth embodiment of the present invention, with the reference voltage from the first internal clock generating circuit, the second internal clock generating circuit performs phase comparison and frequency comparison between the second internal clock signal and the external data based on the reference voltage to adjust the phase/frequency of the second internal clock signal. Therefore, when the reference voltage is stabilized, the second internal clock signal different in frequency and phase from the first internal clock signal can be produced stably and fast.

The frequency difference detecting circuit is arranged only in an internal clock generating circuit as necessary, and may not be arranged in all internal clock generating circuits, thereby reducing the circuit occupying area.

[Eleventh Embodiment]

Figure 24:
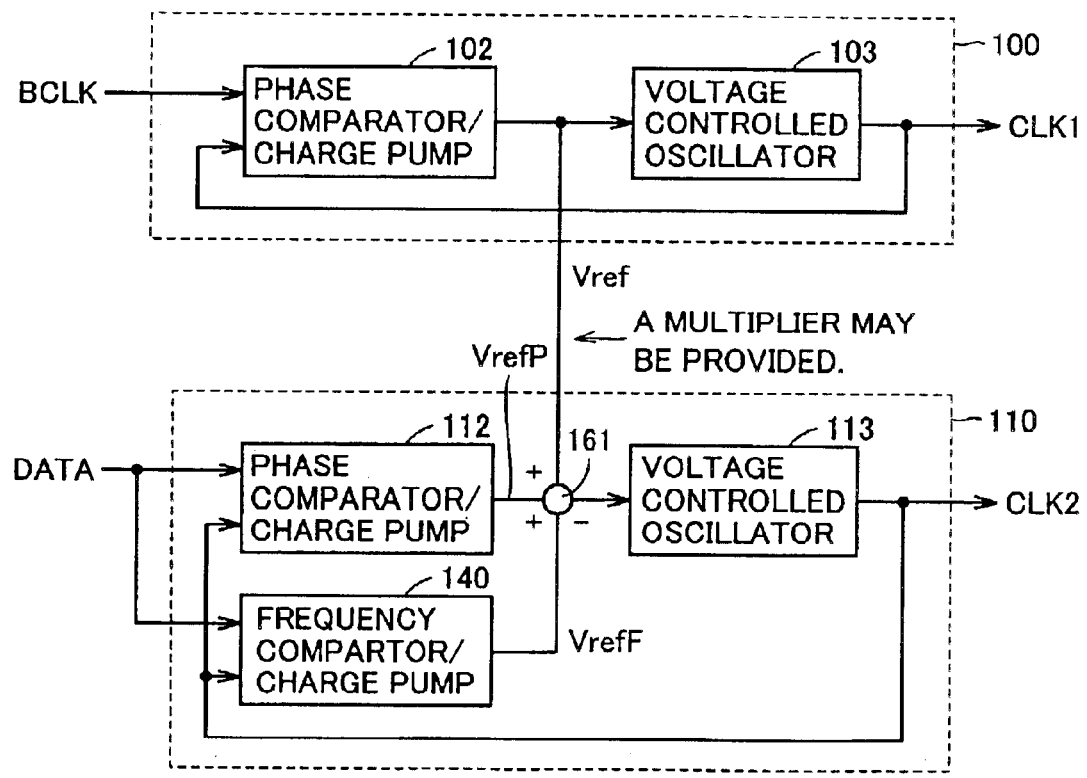
FIG. 24 is a diagram schematically showing a configuration of a semiconductor device in accordance with an eleventh embodiment of the present invention.

FIG. 24 is a diagram schematically showing an overall configuration of a semiconductor device in accordance with an eleventh embodiment of the present invention. The semiconductor device shown in FIG. 24 differs from the semiconductor device shown in FIG. 21 in configuration in the following point. In second internal clock generating circuit 110, voltage controlled oscillator 113 receives, from an addition circuit 161 as the control voltage, a voltage equal to a difference between the sum of reference voltage Vref and phase error voltage VrefP outputted by phase difference detecting circuit 112, and frequency error voltage VrefF outputted by frequency difference detecting circuit 140. The other configuration of the semiconductor device shown in FIG. 24 is the same as the configuration of the semiconductor device shown in FIG. 21, and the corresponding part will be denoted with the same reference numeral and therefore the detail description thereof will not be repeated.

In the semiconductor device shown in FIG. 24, voltage Vref+VrefP−VrefF is supplied as the control voltage from addition circuit 161 to voltage controlled oscillator 113. Therefore, when reference voltage Vref held at a constant voltage level is supplied from first internal clock generating circuit 100, second internal clock generating circuit 110 performs frequency difference detection and phase difference detection operations in the vicinity of the oscillation frequency defined by reference voltage Vref, and produces error voltages VrefF and VrefP in accordance with the respective detected frequency difference and phase difference.

Frequency error voltage VrefF acts in a manner to lower the oscillation frequency of voltage controlled oscillator 113, and phase error voltage VrefP functions in a manner to increase the oscillation frequency of voltage controlled oscillator 113, that is, to advance the phase of internal clock signal CLK2. Therefore, as internal clock signal CLK2, such an internal clock signal CLK2 can be obtained that has a lower frequency and a phase lead with respect to first internal clock signal CLK1. In other words, when external data DATA is slightly lower in frequency and leads in phase with respect to basic clock signal BCLK, internal clock signal CLK2 phase-locked with this external data DATA can be produced fast and stably.

The configuration of addition circuit 151 shown in FIGS. 22 and 23 can be utilized for addition circuit 161. The addition circuit that performs an addition of phase error voltage VrefP and a subtraction of frequency error signal VrefF can be obtained by exchanging the positions of error voltages VrefP and VrefF in the arrangement of FIGS. 22 and 23.

It is noted that in the configuration shown in FIG. 24, reference voltage Vref may be transmitted to second internal clock generating circuit 110 through a multiplier from first internal clock generating circuit 100. In the use of a multiplier, the multiplication coefficient may be equal to or greater than unity, or it may be smaller than unity.

As described above, in accordance with the eleventh embodiment of the present invention, the basic oscillation frequency is set based on reference voltage Vref maintained at a constant voltage level in stabilization of the first internal clock signal, and thereafter the frequency is adjusted with respect to the external data in accordance with the frequency difference and the phase difference. Thus, even when external data DATA has a frequency and a phase slightly different from those of basic clock signal BCLK, an internal clock signal phase-locked with the data can precisely be generated. Therefore, a plurality of internal clock signals different in phase and frequency can be generated stably.

[Twelfth Embodiment]

Figure 25:
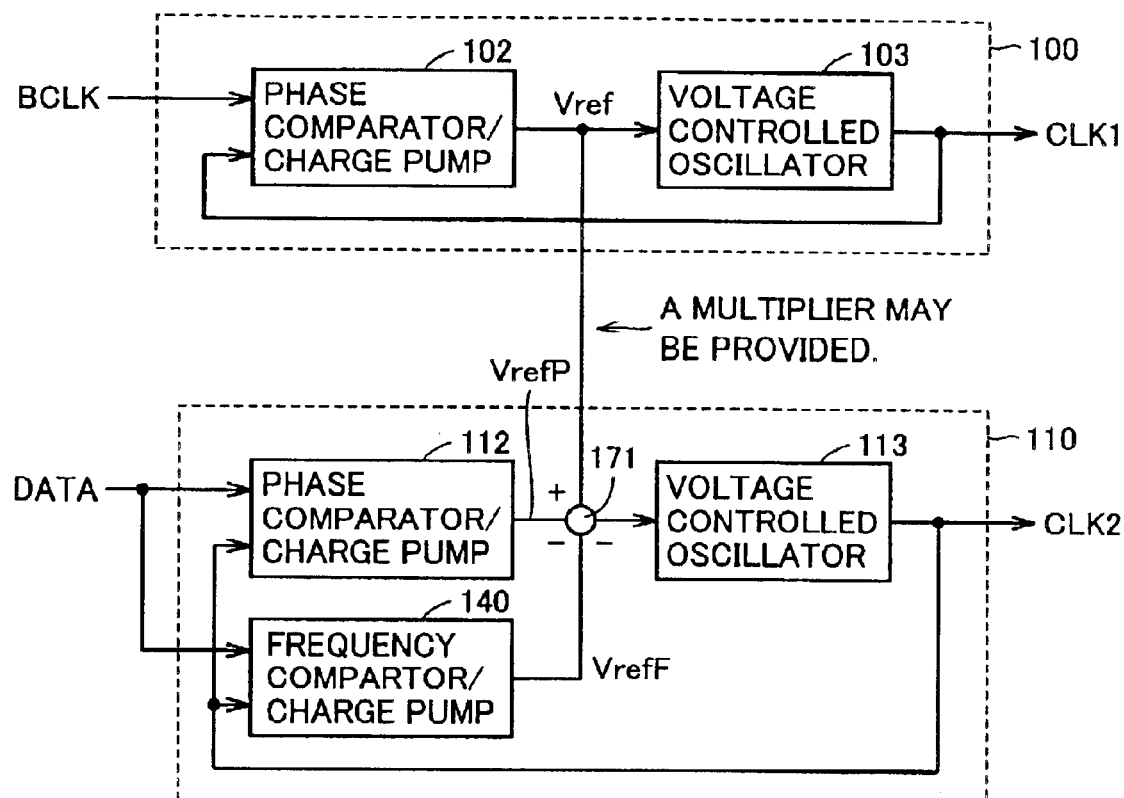
FIG. 25 is a diagram schematically showing a configuration of a semiconductor device in accordance with a twelfth embodiment of the present invention.

FIG. 25 is a diagram schematically showing a configuration of a semiconductor device in accordance with a twelfth embodiment of the present invention. The semiconductor device shown in FIG. 25 differs from the semiconductor device shown in FIG. 24 in configuration in the following point. In second internal clock generating circuit 110, an addition circuit 171 that generates a control voltage for voltage controlled oscillator 113 performs a subtraction of error voltages VrefP and VrefF from reference voltage Vref. The other configuration of the semiconductor device shown in FIG. 25 is the same as the configuration of the semiconductor device shown in FIG. 24, and the corresponding part will be denoted with the same reference numeral and therefore the detail description thereof will not be repeated.

In the case of the configuration of the semiconductor device shown in FIG. 25, in accordance with reference voltage Vref held at a constant voltage level, voltage controlled oscillator 113 oscillates first at an oscillation frequency equal to that of voltage controlled oscillator 103 included in first internal clock generating circuit 100, as a basic oscillation frequency. When phase comparison and frequency comparison operations are performed with respect to external data DATA, error voltage VrefP and VrefF are produced in accordance with those comparison operations. Therefore, the oscillation frequency of voltage controlled oscillator 113 is made lower than the oscillation frequency defined by reference voltage Vref and also the phase thereof is lagged. In other words, when external data DATA has a lower frequency and a phase lag with respect to basic clock signal BCLK, internal clock signal CLK2 can be phase-locked with external data DATA at high speed.

It is noted that as the configuration of addition circuit 171 shown in FIG. 25, the configuration shown in FIG. 22 or 23 can be used. Error voltage VrefF is also applied at the subtraction side.

Also in the configuration of the semiconductor device shown in FIG. 25, control voltage Vref generated from first internal voltage generating circuit 100 may be multiplied by a prescribed factor using a multiplier and then be applied to addition circuit 171. Also in this case, the multiplication coefficient may be equal to or greater than unity, or it may be a value smaller than unity.

As described above, in accordance with the twelfth embodiment of the present invention, for the voltage controlled oscillator that oscillates at the oscillation frequency determined by reference voltage Vref, the control voltage level therefor is lowered in accordance with a phase difference and a frequency difference. Consequently, an internal clock signal that is phase-locked fast and stably with the external data having a lower frequency and a phase lag with respect to the external clock signal can be generated based on the first internal clock signal that is generated stably. Therefore, a plurality of internal clock signals different in phase/frequency can be produced at high speed.

[Thirteenth Embodiment]

Figure 26:
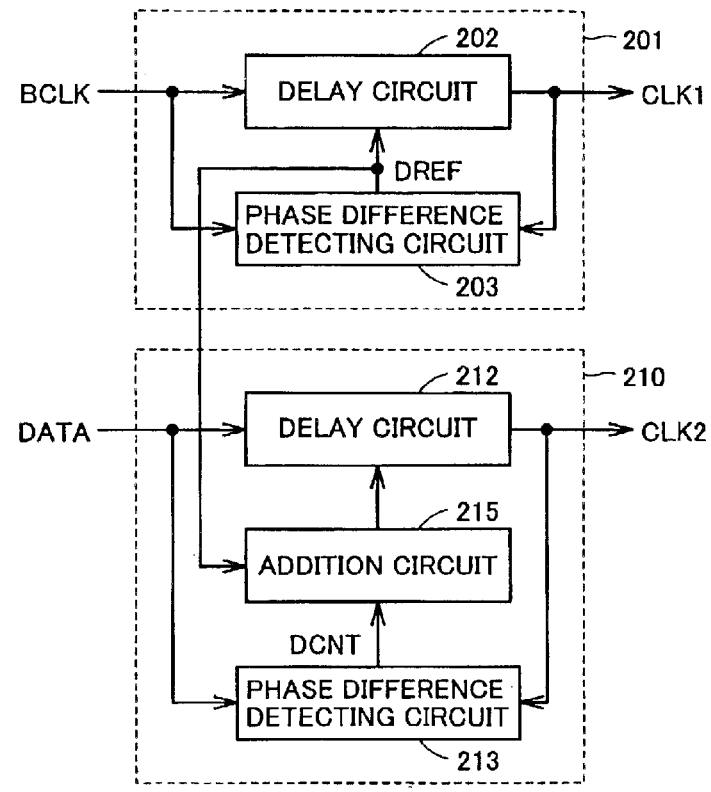
FIG. 26 is a diagram schematically showing a configuration of a semiconductor device in accordance with a thirteenth embodiment of the present invention.

FIG. 26 is a diagram schematically showing a configuration of a semiconductor device in accordance with a thirteenth embodiment of the present invention. Also in FIG. 26, internal clock generating circuits 201 and 210 are provided which generate first and second internal clock signals CLK1 and CLK2 having different phases from each other. First internal clock generating circuit 201 includes a delay circuit 202 delaying basic clock signal BCLK to produce first internal clock signal CLK1, and a phase difference detecting circuit 203 for detecting a phase difference between basic clock signal BCLK and first internal clock signal CLK1 and producing control signal DREF based on the phase difference to adjust a delay amount of delay circuit 202.

Control signal DREF may be a current signal or may be a voltage signal. Delay circuit 202 is comprised, for example, of multiple stages of inverters, and the operating current of each inverter is adjusted in accordance with control signal DREF. Internal clock generating circuit 201 is generally known as DLL (Delayed Locked Loop), and shifts the phase of basic clock signal BCLK to produce internal clock signal CLK1 having the same frequency as basic clock signal BCLK.

Second internal clock generating circuit 210 includes a delay circuit 212 delaying external data DATA to generate second internal clock signal CLK2, a phase difference detecting circuit 213 for detecting a phase difference between external data DATA and second internal clock signal CLK2 to produce control signal DCNT based on the detected phase difference, and an addition circuit 215 for performing an addition of control signal DCNT from detecting circuit 213 and control signal DREF from phase difference detecting circuit 203. The delay amount of delay circuit 212 is adjusted in accordance with the output signal of addition circuit 215. Delay circuit 212 is also comprised, for example, of multiple stages of inverters, the operating current thereof is adjusted in accordance with the output signal of addition circuit 215, and the delay time is adjusted, accordingly.

These internal clock generating circuits 201 and 210 have the same operation characteristics. Therefore, delay circuits 202 and 212 have the same delay time if the magnitude of the control signal is the same.

Addition circuit 215 produces control signal DREF+DCNT or DREF−DCNT based on control signals DREF and DCNT.

In the case of the configuration of the semiconductor device shown in FIG. 26, when first internal clock generating circuit 201 operates stably, control signal DREF is held at a constant level (current or voltage level). Therefore, delay circuit 212 has its delay amount set equal to that of delay circuit 202 to delay external data DATA. At this time, based on the phase difference between external data DATA and internal clock signal CLK2, control signal DCNT is generated and in accordance with the output signal of addition circuit 215 the delay amount of delay circuit 212 is adjusted. Therefore, when external data DATA is close in frequency to basic clock signal BCLK, the phase adjustment allows internal clock signal CLK2 phase-locked with external data DATA to be produced at high speed.

It is not necessarily required that external data DATA and basic clock signal BCLK have the same frequency. If delay control signal DREF is in a stable state, a phase adjustment operation is performed in second internal clock generating circuit 210 with reference to delay control signal DREF, for delaying external data DATA to generate internal clock signal CLK2.

Also in the configuration using such DLL, internal clock signals different in phase or frequency can internally be produced stably.

It is noted that also in the configuration shown in FIG. 26, control signal DREF is multiplied by a multiplication circuit to be applied to addition circuit 215.

As described above, in accordance with the thirteenth embodiment of the present invention, even in the configuration using DLL to produce an internal clock signal, a delay adjustment is performed on another internal clock signal using the control signal setting the phase of the basic clock signal as a reference signal, and a plurality of internal clock signals different in phase/frequency can be produced fast and stably.

[Fourteenth Embodiment]

Figure 27:
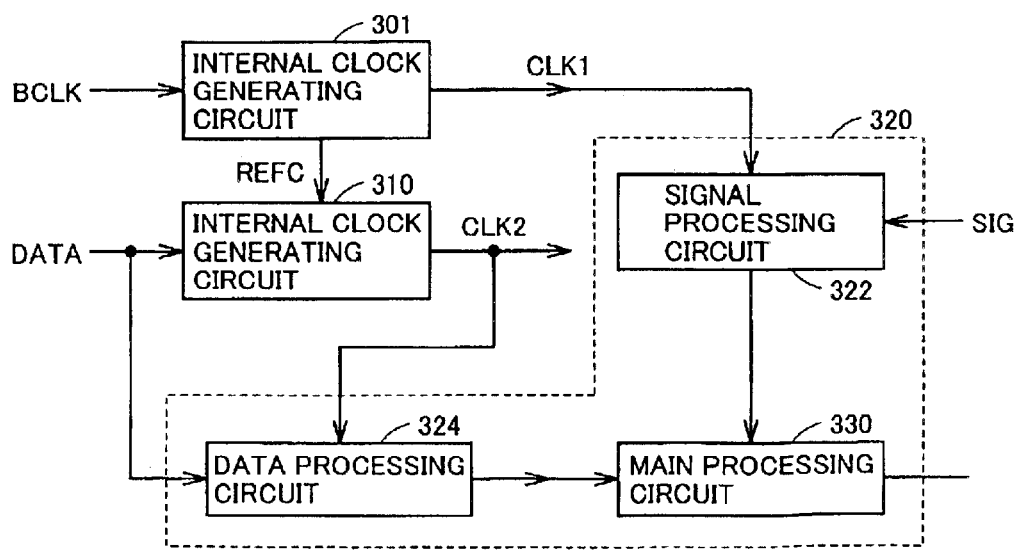
FIG. 27 is a diagram schematically showing an overall configuration of a semiconductor device in accordance with a fourteenth embodiment of the present invention.

FIG. 27 is a diagram schematically showing a configuration of a semiconductor device in accordance with a fourteenth embodiment of the present invention. In FIG. 27, the semiconductor device includes an internal clock generating circuit 301 for producing internal clock signal CLK1 phase-locked with basic clock signal BCLK, and an internal clock generating circuit 310 for producing internal clock signal CLK2 phase-locked with external data DATA.

Internal clock generating circuit 310 refers to a control signal REFC produced by internal clock generating circuit 301, that is, has the basic frequency thereof determined by control signal REFC, and adjusts phase/frequency of internal clock signal CLK2 in the vicinity of the basic region in accordance with a phase/frequency comparison result between internal clock signal CLK2 and external data DATA, to generate internal clock signal CLK2 phase-locked with external data DATA. As the configuration of internal clock generating circuits 301 and 310, any one of the first to thirteenth embodiments may be used.

The semiconductor device further includes an internal circuit 320 operating in accordance with internal clock signals CLK1 and CLK2 and performing a prescribed processing. Internal circuit 320 may be a synchronous type circuit operating in synchronization with these internal clock signals CLK1 and CLK2.

Internal circuit 320 includes a signal processing circuit 322 taking in an external signal SIG in accordance with internal clock signal CLK1 to execute a prescribed processing on the taken-in signal, a data processing circuit 324 taking in external data DATA in accordance with internal clock signal CLK2 and generating internal data to perform a prescribed processing, and a main processing circuit 330 further executing a predetermined processing in accordance with the output signal/data of processing circuits 322 and 324. A final processing result is output from main processing circuit 330 in accordance with, for example, basic clock signal BCLK.

Signal SIG is, for example, a control signal designating an operation mode, and an address signal indicative of transfer source/destination, and external data DATA is, for example, communication data. The semiconductor device is used in the application of packet communications such as the Internet by way of example. An internal clock signal synchronized with transmission data is internally generated. Alternatively, the semiconductor device may be a synchronous type memory and may be configured to send and receive data DATA in accordance with external signal SIG. In a case of a memory configuration, signal processing circuit 322 includes a signal input buffer and the like, and data processing circuit 324 includes a data input buffer and the like. Main processing circuit 330 includes a memory array, a memory select circuit and others.

In the semiconductor device shown in FIG. 27, if a distance between an input buffer and an input pin and a propagation delay amount of an internal signal propagation path differ among signal SIG, clock signal BCLK and data DATA, internal clock signals CLK1 and CLK2 optimized for the respective circuits can be generated stably.

It is noted that in the configuration shown in FIG. 27, with reference to first internal clock signal CLK1, that is, with control signal REFC setting the basic frequency region of second internal clock signal CLK2, the phase/frequency comparison is performed in the vicinity of the basic frequency region, to control second internal clock signal CLK2 with respect to data DATA. Where the signal SIG is continuously applied and synchronization of an internal clock signal on the signal SIG is allowed, an internal clock generating circuit may also be provided for this signal SIG.

As described above, in accordance with the fourteenth embodiment of the present invention, a plurality of internal clock signals are generated with reference to one internal clock signal, and the internal clock signals can be generated stably.

It is noted that in the first to twelfth embodiments described above, with reference to a reference voltage/reference current that sets an oscillation frequency of an oscillator generating a first internal clock signal, an oscillation frequency of an oscillator generating another internal clock signal is adjusted. The following configuration may be used as the configuration to adjust this oscillation frequency. In a phase difference detecting circuit, charge pump operation is performed to charge a capacitance element. The charged voltage of this capacitance element is used as a reference voltage to be applied to a second internal clock generating circuit. The second internal clock generating circuit adjusts the charged voltage of the associated capacitance element in accordance with a charging/discharging operation through the charge pump operation for the capacitance element in the first circuit. The charged voltage of the associated capacitance element is supplied to an oscillator through a loop filter. In the case of a current controlled oscillator, based on this charged voltage, the operating current of the oscillator is generated using a current mirror circuit or the like. Alternatively, this charged voltage is used as a control voltage to set an oscillation frequency of a voltage controlled oscillator.

Therefore, an oscillation operation may be configured to be controlled based on a signal (current/voltage) at a preceding stage that adjusts an oscillation frequency, rather than current/voltage that directly determines and sets the oscillation frequency of the oscillator. Any signal (current/voltage) can be utilized in the present invention as far as it corresponds to the oscillation control current/voltage of the oscillator.

Furthermore, in the first to thirteenth embodiments, two internal clock signals CLK1 and CLK2 are generated. However, the number of internal clock signals to be generated is not limited to two and may be defined appropriately depending on the number of signals to be synchronized. For each signal, a corresponding internal clock signal merely needs to be generated based on the reference voltage/current/signal of the basic clock signal.

As described above, in accordance with the present invention, with reference to a signal (current/voltage) that determines an operation speed (frequency and/or phase) of an internal clock generating circuit stably operating, adjustment is performed in generating another internal clock signal. Thus, a plurality of internal clock signals having phase and/or frequency close to and different from each other can be generated stably and reliably.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor device comprising:

first internal clock generation circuitry for producing a first internal clock signal synchronized with a basic clock signal, said first internal clock generation circuitry including a first phase difference detecting circuit for detecting a phase difference between said basic clock signal and said first internal clock signal to produce a first control signal in accordance with the phase difference, and a first clock generating circuit having an operation speed thereof determined in accordance with the first control signal output by said first phase difference detecting circuit and operating in accordance with the operation speed to produce a clock signal corresponding to said basic clock signal as said first internal clock signal; and second internal clock generation circuitry for producing a second internal clock signal synchronized with a synchronization target signal, said second internal clock generation circuitry including a second phase difference detecting circuit for detecting a phase difference between said synchronization target signal and said second internal clock signal to produce a phase error signal in accordance with the phase difference, a control circuit for producing a second control signal in accordance with at least either of said first control signal and a signal corresponding to said first control signal and said phase error signal, and a second clock generating circuit having an operation speed thereof determined in accordance with the second control signal output by said control circuit and operating in accordance with the operation speed to produce a signal corresponding to said synchronization target signal as said second internal clock signal, wherein said second internal clock generation circuitry further includes a frequency difference detecting circuit for detecting a frequency difference between said second internal clock signal and said synchronization target signal to produce and apply to said control circuit a frequency error signal in accordance with the frequency difference, and said control circuit produces said second control signal in accordance with said frequency error signal, said phase error signal and either of said first control signal and the signal corresponding to said first control signal.

2. The semiconductor device according to claim 1, wherein said control circuit includes an addition circuit receiving said first control signal as said signal corresponding to said first control signal and performing a signed addition of said first control signal, said phase error signal and said frequency error signal.

3. The semiconductor device according to claim 1, further comprising a multiplication circuit for multiplying said first control signal by a prescribed coefficient and applying a multiplied signal to said control circuit as said signal corresponding to said first control signal, wherein said control circuit includes an addition circuit receiving the multiplied signal of said multiplication circuit, said phase error signal and said frequency error signal, for performing a signed addition of received signals.

4. The semiconductor device according to claim 1, wherein the first and second clock generating circuits each are a current controlled oscillation circuit, and the first and second control signals adjust operating current amounts of the first and second clock generating circuits, respectively.

5. The semiconductor device according to claim 1, wherein the first and second clock generating circuits each comprise a voltage control oscillation circuit, and the first and second control signals are each used as a control voltage for a corresponding voltage control oscillation circuit.

6. The semiconductor device according to claim 1, wherein said control circuit receives said first control signal.

7. The semiconductor device according to claim 6, wherein said control circuit includes an addition circuit for performing a signed addition of said first control signal and said phase error signal.

8. The semiconductor device according to claim 1, further comprising a multiplication circuit for multiplying said first control signal by a prescribed coefficient and applying a multiplied signal to said control circuit as said signal corresponding to said first control signal.

9. The semiconductor device according to claim 8, wherein said control circuit includes an addition circuit for performing a signed addition said first control signal and said phase error signal.

10. The semiconductor device according to claim 1, wherein the first and second clock generating circuits include delay circuits, respectively, and the first and second control signals adjust delay amounts of the delay circuits of the first and second clock generating circuits, respectively.

* * * * *